United States Patent
Yasui et al.

(10) Patent No.: US 6,427,438 B1
(45) Date of Patent: Aug. 6, 2002

(54) METHOD OF EVALUATING DETERIORATED STATE OF CATALYTIC CONVERTER FOR PURIFYING EXHAUST GAS

(75) Inventors: Yuji Yasui; Yoshikazu Oshima, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/708,707

(22) Filed: Nov. 9, 2000

(30) Foreign Application Priority Data

Nov. 12, 1999 (JP) .......................................... 11-322428

(51) Int. Cl.[7] .............................................. F01N 3/00
(52) U.S. Cl. ............................ 60/277; 60/274; 60/276; 60/285
(58) Field of Search .................... 60/274, 276, 277, 60/285; 73/861.31, 118.1; 123/674; 701/109, 103

(56) References Cited

U.S. PATENT DOCUMENTS 4,394,351 A * 7/1983 Gast ............................ 60/301

(List continued on next page.)

FOREIGN PATENT DOCUMENTS

| JP | 4-369471 | 12/1992 |
|---|---|---|
| JP | 5-79374 | 3/1993 |
| JP | 7-83094 | 3/1995 |
| JP | 8-21273 | 1/1996 |
| JP | 8-105345 | 4/1996 |

OTHER PUBLICATIONS

Ser. No.: 09/311,353; filed: May 13, 1999; By: Yuji Yasui et al For: Plant Control System, now U.S. Ser. 6,188,953.
Ser. No. 09/465,765, filed: Dec. 17, 1999; By: Yuji Yasui et al For: Air–Fuel Ratio Control System For Internal Combustion Engine.
Ser. No. 09/465,395, filed: Dec. 17, 1999; By: Yuji Yasui et al For: Plant Control System, now U.S. Ser. 6,230,486.
Ser. No. 09/465,766, filed: Dec. 17, 1999; By: Yuji Yasui et al For: Plant Control System, now U.S. Ser. 6,266,605.
Ser. No. 09/499,975, filed: Feb. 8, 2000; By: Yuji Yasui et al For: Air–Fuel Ratio Control System For Internal Combustion Engine, now U.S. Ser. 6,195,988.
Ser. No. 09/548,931; filed: Apr. 13, 2000; By: Yuji Yasui For: Plant Control System, now U.S. Ser. 6,256,983.
Ser. No. 09/680,480; filed: Oct. 6, 2000; By: Yuji Yasui et al For: Air–Fuel Ratio Control System For Multicylinder Internal Combustion Engine.
Ser. No. 09/680,482; filed: Oct. 6, 2000; By: Yuji Yasui et al For: Air–Fuel Ratio Control System For Multicylinder Internal Combustion Engine.

*Primary Examiner*—Thomas Denion
*Assistant Examiner*—Tu M. Nguyen
(74) *Attorney, Agent, or Firm*—Arent Fox Kintner Plotkin & Kahn, PLLC

(57) ABSTRACT

The characteristics of an output of an exhaust gas sensor with respect to an air-fuel ratio of an engine are expressed according to a quadratic function, and the parameters of the quadratic function are sequentially identified according to a sequential identifying algorithm using data of the output of the exhaust gas sensor and data of an output of an air-fuel sensor which detects the air-fuel ratio of the engine. Deterioration evaluating parameters whose values change as the deterioration of a catalytic converter processes are sequentially determined from the identified values of the parameters of the quadratic function, and the deteriorated state of the catalytic converter is evaluated based on the determined deterioration evaluating parameters.

15 Claims, 16 Drawing Sheets

U.S. PATENT DOCUMENTS

| | | | | |
|---|---|---|---|---|
| 4,432,243 A | * | 2/1984 | Lowell et al. | 73/861.31 |
| 5,539,638 A | * | 7/1996 | Keeler et al. | 60/274 |
| 5,557,933 A | * | 9/1996 | Numata et al. | 60/274 |
| 5,627,757 A | * | 5/1997 | Comignaghi et al. | 60/277 |
| 5,694,910 A | | 12/1997 | Hasegawa et al. | |
| 5,703,777 A | * | 12/1997 | Buchhop et al. | 701/109 |
| 5,732,551 A | * | 3/1998 | Naber et al. | 60/277 |
| 5,845,490 A | | 12/1998 | Yasui et al. | |
| 5,845,491 A | | 12/1998 | Yasui et al. | |
| 5,852,930 A | | 12/1998 | Yasui et al. | |
| 5,880,952 A | | 3/1999 | Yasui et al. | |
| 5,924,281 A | | 7/1999 | Yasui et al. | |
| 5,937,638 A | * | 8/1999 | Akazaki et al. | 60/274 |
| 5,941,928 A | * | 8/1999 | Naber et al. | 701/109 |
| 6,073,440 A | * | 6/2000 | Douta et al. | 60/277 |
| 6,079,205 A | | 6/2000 | Yasui et al. | |
| 6,082,099 A | | 7/2000 | Yasui et al. | |
| 6,112,517 A | | 9/2000 | Yasui et al. | |
| 6,151,888 A | * | 11/2000 | Schneider et al. | 60/277 |

* cited by examiner

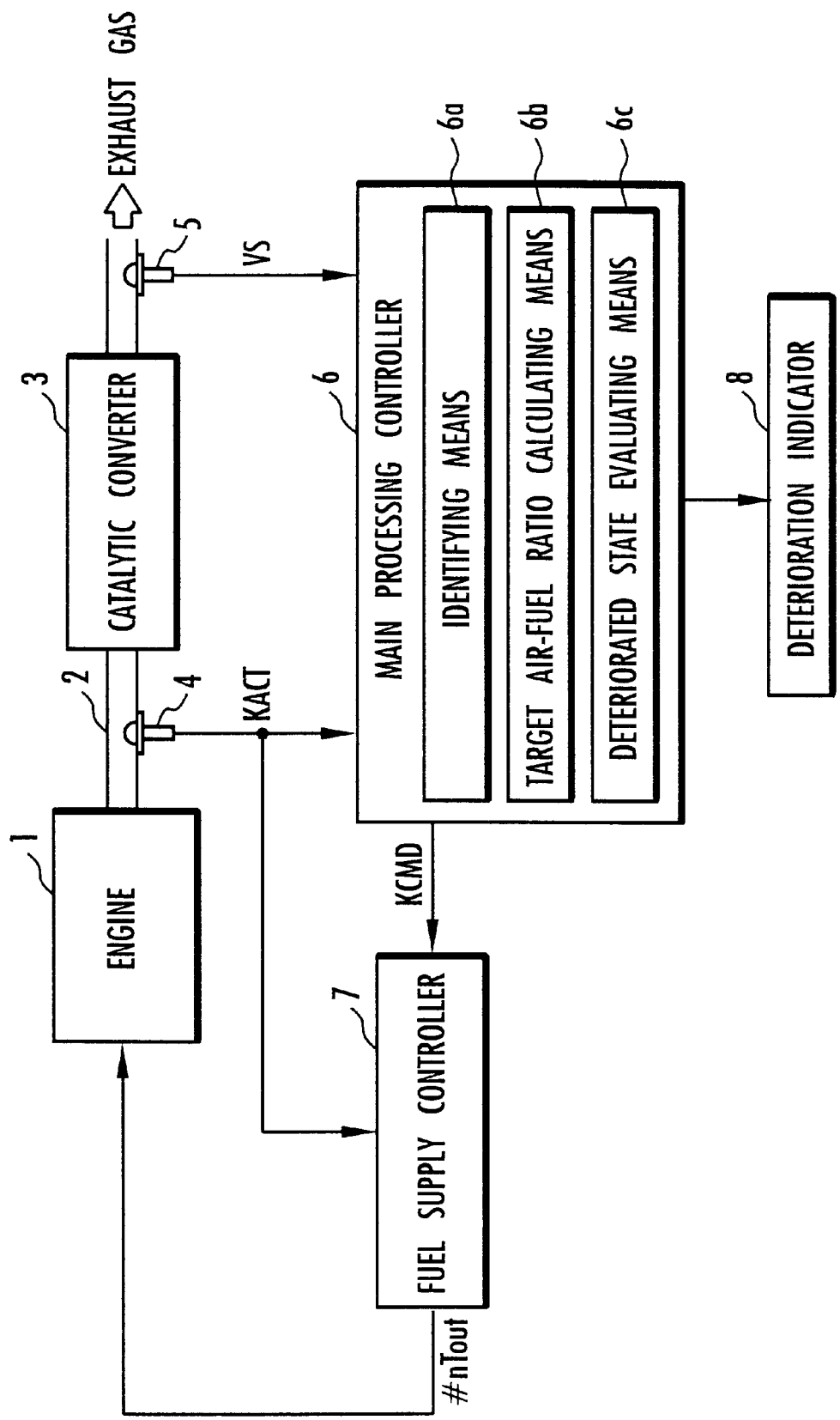

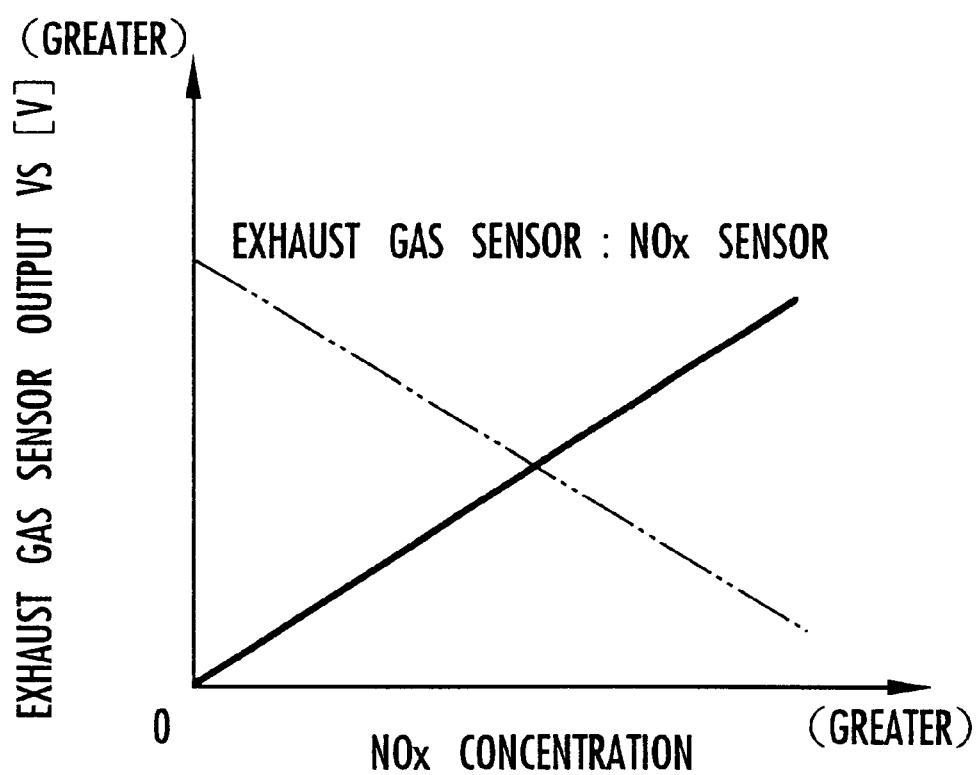

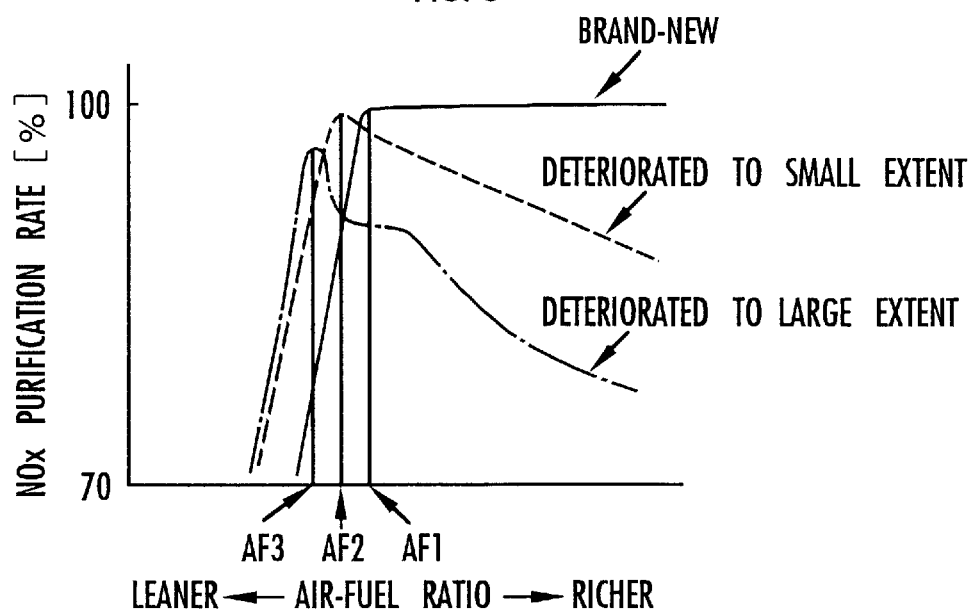
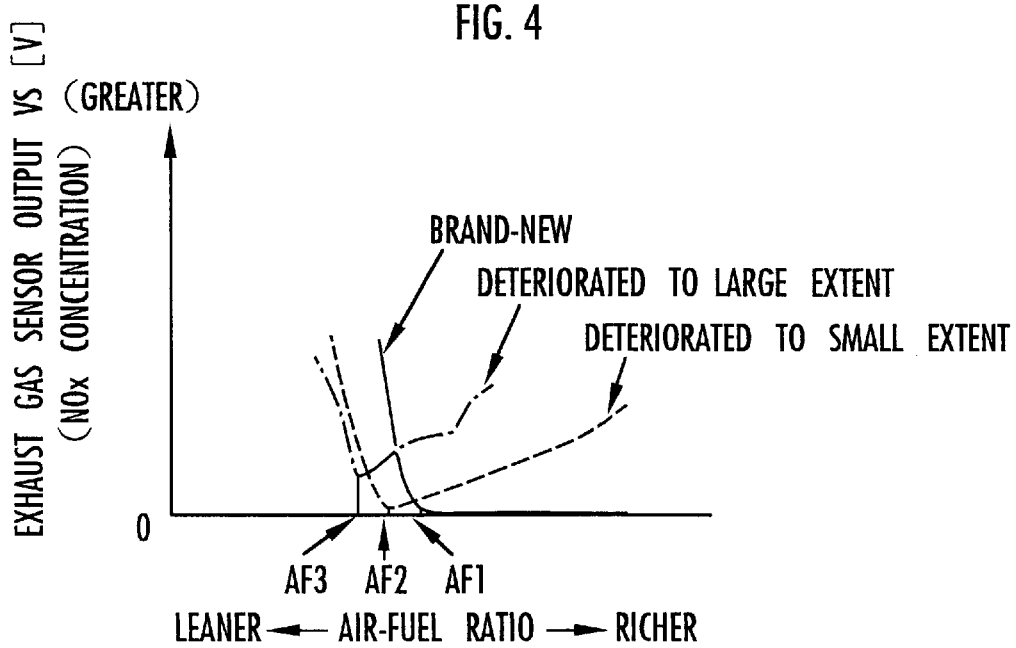

METHOD OF EVALUATING DETERIORATED STATE OF CATALYTIC CONVERTER FOR PURIFYING EXHAUST GAS

BACKGROUND OF THE INVENTION

1. Field of the Invention

The present invention relates to a method of evaluating a deteriorated state of a catalytic converter for purifying an exhaust gas which is disposed in the exhaust passage of an internal combustion engine.

2. Description of the Related Art

Generally, catalytic converters such as three-way catalytic converters are disposed in the exhaust passages of internal combustion engines for purifying gas components including HC (hydrocarbon), NOx (nitrogen oxides), etc. contained in the exhaust gas emitted from the internal combustion engines.

Each of the gas components is purified by the catalytic converter at a substantially maximum purification rate when the air-fuel ratio of the exhaust gas upstream of the catalytic converter is of a certain value or a value close thereto. If the actual air-fuel ratio is shifted from the certain value to a fuel-lean value or a fuel-rich value, then the purification rate of the gas component tends to be lowered. The air-fuel ratio of the exhaust gas upstream of the catalytic converter specifically is recognized from the concentration of oxygen in the exhaust gas that enters the catalytic converter and represents the air-fuel ratio of an air-fuel mixture which is burned by the internal combustion engine to produce the exhaust gas. The air-fuel ratio will hereinafter be referred to as the air-fuel ratio of the internal combustion engine.

The catalytic converters of the above type are gradually deteriorated, with their purifying capability lowered, due to continued use over time. In order to keep the exhaust gas purified adequately by a catalytic converter, the catalytic converter needs to be replaced with a new one when it is deteriorated to a certain extent. For properly replacing the deteriorated catalytic converter with a new one, it is necessary to rely on a technology to evaluate a deteriorated state of the catalytic converter appropriately.

In recent years, there have been developed exhaust gas sensors, specifically HC sensors and NOx sensors, capable of detecting relatively accurately the concentrations of various gas components, including HC, NOx, etc., to be purified by catalytic converters. Some of these exhaust gas sensors generally have their output levels increasing substantially linearly as the concentrations of the detected gas components increase. The output levels of other exhaust gas sensors decrease as the concentrations of the detected gas components increase. The output characteristics of the exhaust gas sensors of the former type will hereinafter be referred to as positive characteristics, and the output characteristics of the exhaust gas sensors of the latter type will hereinafter be referred to as negative characteristics.

Since the above exhaust gas sensors are capable of detecting the concentrations of gas components that are actually purified by a catalytic converter, i.e., the concentrations of gas components which are directly affected by the deteriorated state of the catalytic converter, the exhaust gas sensors can effectively be used to recognize the deteriorated state of the catalytic converter.

For example, two exhaust gas sensors are disposed respectively upstream and downstream of the catalytic converter, and while the internal combustion engine is in operation, the ratio of output levels of those exhaust gas sensors is determined to directly recognize the purification rate of the gas component detected by the exhaust gas sensors and purified by the catalytic converter. The purification rate decreases as the deterioration of the catalytic converter goes on. Therefore, if the purification rate of the gas component is recognized as described above, then it is possible to appropriately determine the deteriorated state of the catalytic converter.

However, due to the effect of a response delay of the catalytic converter, it is actually difficult to accurately recognize the purification rate of the gas component detected by the exhaust gas sensors and purified by the catalytic converter. Attempts to increase the accuracy of the purification rate that can be recognized by canceling the effect of the response delay of the catalytic converter are liable to be complex.

For the above reasons, there has been a demand for a new technology capable of appropriately determining the deteriorated state of a catalytic converter according to a relatively simple process using exhaust sensors such as HC sensors and NOx sensors.

SUMMARY OF THE INVENTION

It is therefore an object of the present invention to provide a method of appropriately evaluating a deteriorated state of a catalytic converter for purifying an exhaust gas, according to a relatively simple process using an exhaust sensor which detects a gas component such as HC, NOx, or the like to be purified by the catalytic converter.

To achieve the above object, there is provided a method of evaluating a deteriorated state of a catalytic converter which is disposed in an exhaust passage of an internal combustion engine for purifying an exhaust gas flowing through the exhaust passage, using data of the output of an exhaust gas sensor which is disposed downstream of the catalytic converter for detecting the concentration of a particular component of the exhaust gas purified by the catalytic converter while the internal combustion engine is in operation, comprising the steps of identifying the values of parameters contained in a nonlinear function of a predetermined type for expressing the correlating characteristics of the concentration of the particular component detected by the exhaust gas sensor with respect to an air-fuel ratio of the exhaust gas upstream of the catalytic converter, using data of the air-fuel ratio of the exhaust gas upstream of the catalytic converter and the data of the output of the exhaust gas sensor, and evaluating the deteriorated state of the catalytic converter based on the identified values of the parameters.

The quadratic function has an independent variable represented by the air-fuel ratio of the exhaust gas upstream of the catalytic converter, e.g. the output of a sensor for detecting the air-fuel ratio, the air-fuel ratio recognized from the output of the sensor, or a target value of the air-fuel ratio, and a dependent variable represented by the output of the exhaust gas sensor or the concentration of the particular component recognized from the output of the exhaust gas sensor. The nonlinear function may be a function of higher degree, e.g., a quadratic function, a cubic function, or the like. The parameters specifically comprise parameters which determine the configuration of the graph of the nonlinear function. For example, if the nonlinear function is a function of higher degree, e.g., a quadratic function, a cubic function, or the like, then the parameters comprise coefficients of terms of the different degrees and a constant term thereof.

The air-fuel ratio of the exhaust gas upstream of the catalytic converter specifically comprises an air-fuel ratio recognized from the concentration of oxygen contained in the exhaust gas. The air-fuel ratio may be referred to simply as an air-fuel ratio of the internal combustion engine.

The particular component detected by the exhaust gas sensor may comprise HC (hydrocarbon), NOx (nitrogen oxide), or the like. Thus, the exhaust gas sensor may comprise an HC sensor, an NOx sensor, or the like.

In the above identifying step, the values of the parameters of the nonlinear function are identified using data of the air-fuel ratio of the internal combustion engine, i.e., the data of the air-fuel ratio of the exhaust gas upstream of the catalytic converter, and the data of the output of the exhaust gas sensor, i.e., the data of the detected value of the concentration of the particular component, thus determining the nonlinear function which approximately expresses, with an equation, the correlating characteristics of the concentration of the particular component detected by the exhaust gas sensor with respect to the air-fuel ratio of the internal combustion engine, i.e., determining the configuration of the graph of the nonlinear function.

The concentration of the particular component detected by the exhaust gas sensor, i.e., the concentration of the particular component of the exhaust gas that has been purified by the catalytic converter, generally tends to have a minimum value with respect to a change in the air-fuel ratio of the internal combustion engine. Such correlating characteristics can appropriately be expressed by a nonlinear function of a suitable type, e.g., a quadratic function.

When the values of the parameters of the nonlinear function are identified in the above identifying step, the configuration of the graph of the nonlinear function determined by the identified values of the parameters tends to exhibit a certain characteristic change. Specifically, the identified values of the parameters of the nonlinear function reflect the deteriorated state of the catalytic converter. According to the present invention, the evaluating steps evaluates the deteriorated state of the catalytic converter based on the values of the parameters of the nonlinear function which are identified in the above identifying step.

Since the identified values of the parameters of the nonlinear function are determined by a statistical process, the identified values of the parameters of the nonlinear function are less susceptible to response delay characteristics of the catalytic converter, and properly reflect the deteriorated state of the catalytic converter. The values of the parameters of the nonlinear function can be determined according to a known process such as a method of least squares or the like. Therefore, the deteriorated state of the catalytic converter can appropriately be evaluated according to a simple process.

The data of the air-fuel ratio of the internal combustion engine, i.e., the data of the air-fuel ratio up-stream of the catalytic converter, used to identify the values of the parameters of the nonlinear function in the identifying step, may be data representing the value of the air-fuel ratio itself, but should preferably be data representing the difference between the air-fuel ratio of the internal combustion engine and a predetermined reference value.

The values of the parameters of the nonlinear function which are identified using the data representing the difference between the air-fuel ratio of the internal combustion engine and the predetermined reference value are of increased accuracy.

If the air-fuel ratio of the internal combustion engine is controlled at a predetermined target air-fuel ratio, then it is possible to use the target air-fuel ratio as the air-fuel ratio of the internal combustion engine for identifying the values of the parameters of the nonlinear function. Preferably, however, an air-fuel ratio sensor is disposed upstream of the catalytic converter for detecting the air-fuel ratio of the internal combustion engine, and the step of identifying the values of parameters comprises the step of using the air-fuel ratio detected by the air-fuel ratio sensor as the air-fuel ratio of the internal combustion engine for identifying the values of the parameters of the nonlinear function.

The values of the parameters of the nonlinear function which are identified using the air-fuel ratio detected by the air-fuel ratio sensor, i.e., the actual value of the air-fuel ratio of the internal combustion engine (the air-fuel ratio of the exhaust gas upstream of the catalytic converter), are of increased accuracy.

With the air-fuel ratio sensor, the method further comprises the steps of determining the value of an air-fuel ratio which minimizes the concentration of the particular component represented by a function value of the nonlinear function with the values of the parameters thereof being identified, using the identified values of the parameters of the nonlinear function, and obtaining the determined value of the air-fuel ratio as a target air-fuel ratio of the exhaust gas upstream of the catalytic converter, and manipulating the air-fuel ratio of an air-fuel mixture combusted by the internal combustion engine according to a feedback control process to converge the air-fuel ratio detected by the air-fuel ratio sensor to the target air-fuel ratio.

The nonlinear function determined by the values of the parameters which are thus identified approximately expresses the correlating characteristics, i.e., the correlating characteristics of the concentration of the particular component detected by the exhaust gas sensor with respect to the air-fuel ratio of the internal combustion engine. Therefore, when the target air-fuel ratio of the internal combustion engine, i.e., the target air-fuel ratio of the exhaust gas upstream of the catalytic converter, is determined as described above, the target air-fuel ratio basically becomes a target air-fuel ratio which minimizes the concentration of the particular component detected by the exhaust gas sensor, i.e., the concentration of the particular component which has been purified by the catalytic converter. Consequently, when the air-fuel ratio of an air-fuel mixture combusted by the internal combustion engine is manipulated according to a feedback control process to converge the air-fuel ratio detected by the air-fuel ratio sensor to the target air-fuel ratio, the air-fuel ratio of the internal combustion engine is controlled at an air-fuel ratio state which maximizes the purification rate of the particular component by the catalytic converter. Thus, it is possible to well purify the particular component with the catalytic converter, i.e., to purify the particular component at a maximum purification rate, while evaluating the deteriorated state of the catalytic converter.

The air-fuel ratio of the internal combustion engine should preferably be manipulated according to the feedback control process by a recursive-type feedback control means such as an adaptive controller. The recursive-type feedback control means determines a new feedback controlled quantity according to a given recursive formula containing a predetermined number of time-series data, prior to the present time, of the feedback controlled quantity of the air-fuel ratio, e.g., a corrective quantity for the amount of supplied fuel.

The parameters of the nonlinear function may be identified after data representing the air-fuel ratio of the internal combustion engine (the output of the air-fuel sensor or the like) and data of the output of the exhaust gas sensor are collected and accumulated. However, the step of identifying the values of parameters comprises the step of sequentially identifying the values of the parameters of the nonlinear function according to a sequential identifying algorithm.

Since the sequential identifying algorithm is used, a memory capacity required to execute the sequential identifying algorithm may be small. Because the parameters of the nonlinear function are sequentially updated on a real-time basis, it is possible to obtain the identified values of the parameters of the nonlinear function depending on behavioral states of the catalytic converter and the internal combustion engine from instant to instant. As a result, the deteriorated state of the catalytic converter can be evaluated highly reliably based on the identified values of the parameters of the nonlinear function.

The sequential identifying algorithm may comprise any one of the algorithms of a sequential method of least squares, a sequential method of weighted least squares, a fixed gain method, a degressive gain method, etc. According to these algorithms, new values of the parameters are determined, i.e., the values of the parameters are updated, in order to minimize an error or difference between the value of the output of the exhaust gas sensor determined according to the nonlinear function using the present identified values of the parameters and the actual value of the output of the exhaust gas sensor.

In the present invention using the sequential identifying algorithm, the step of identifying the values of parameters preferably comprises the step of identifying the value of at least one of the parameters while limiting the value of the at least one of the parameters to a value satisfying a predetermined condition.

Specifically, the parameters of the nonlinear function include such a parameter that if the value thereof is erroneously identified as a value falling out of a certain desired range due to disturbances or the like, the actual configuration of the graph of the correlating characteristics becomes largely different from the configuration of the graph of the nonlinear function. According to the present invention, when at least one of the parameters of the nonlinear function is to be identified, the value of the parameter is limited to a value which satisfies a certain condition. In this manner, the value of the parameter is made reliable, increasing the reliability of an evaluating parameter that is determined from the value of the parameter.

For example, if the quadratic function comprises a quadratic function, then the step of identifying the values of parameters should preferably comprise the steps of regarding a coefficient of a term of maximum degree of the quadratic function as the at least one of the parameters which is to be limited, and identifying the value of the coefficient while limiting the value of the coefficient in order for the concentration of the particular component represented by the function value of the quadratic function to have a minimum value.

Specifically, the function value of the quadratic function may have a minimum value or a maximum depending on whether the value of the coefficient of the term of maximum degree thereof is positive or negative. Therefore, if the polarity, positive or negative, of the identified value of the coefficient is inappropriate, then the concentration of the particular component represented by the function value of the quadratic function as the nonlinear function has a maximum value, rather than a minimum value which the concentration is to have. Therefore, the identified value of the coefficient is limited such that the concentration of the particular component represented by the function value of the quadratic function has a minimum value. Specifically, the identified value of the coefficient is limited to either a positive or negative value. In this manner, the reliability of the identified value of the parameter and hence the evaluating parameter is increased.

When the concentration of the particular component represented by the function value of the quadratic function has a minimum value, the function value of the nonlinear function may have either a minimum value or a maximum value. Specifically, if the dependent variable of the nonlinear function is represented by the concentration of the particular component recognized from the output of the exhaust gas sensor, then the function value of the nonlinear function has a minimum value at the value of the air-fuel ratio which minimizes the concentration of the particular component represented by the function value of the nonlinear function. If the dependent variable of the nonlinear function is represented by output of the exhaust gas sensor, then the function value of the nonlinear function has a minimum value at the value of the air-fuel ratio which minimizes the concentration of the particular component represented by the function value of the nonlinear function insofar as the output of the exhaust gas sensor has positive characteristics with respect to the concentration of the particular component, i.e., such characteristics that the output increases as the concentration increases. If the dependent variable of the nonlinear function is represented by output of the exhaust gas sensor, then the concentration of the particular component represented by the function value of the nonlinear function decreases as the function value increases insofar as the output of the exhaust gas sensor has negative characteristics with respect to the concentration of the particular component, i.e., such characteristics that the output decreases as the concentration increases. In this case, therefore, the function value of the nonlinear function has a maximum value at the value of the air-fuel ratio which minimizes the concentration of the particular component represented by the function value of the nonlinear function.

When the value (identified value) of the coefficient of the term of maximum degree of the quadratic function is limited, if the dependent variable of the quadratic function as the nonlinear function is represented by the concentration of the particular component recognized from the output of the exhaust gas sensor, or the output of the exhaust gas sensor having the positive characteristics, then the value of the coefficient of the term of maximum degree of the quadratic function is limited to a positive value, and if the dependent variable of the quadratic function is represented by the output of the exhaust gas sensor having the negative characteristics, then the value of the coefficient of the term of maximum degree of the quadratic function is limited to a negative value.

Based on the identified values of the parameters of the nonlinear function, the deteriorated state of the catalytic converter is specifically limited as follows:

The step of evaluating the deteriorated state of the catalytic converter comprises the steps of determining the value of an evaluating parameter defined, using the parameters of the nonlinear function, as representing a change depending on the progress of deterioration of the catalytic converter, from the identified values of the parameters of the nonlinear function, and evaluating the deteriorated state of the catalytic converter based on the value of the evaluating parameter.

When the evaluating parameter determined by the identified values of the parameters of the nonlinear function is introduced, the value of the parameter exhibits a change depending on the progress of deterioration of the catalytic converter, i.e., increases or decreases as the deterioration of the catalytic converter progresses. Therefore, the deteriorated state of the catalytic converter can be evaluated by comparing the value of the evaluating parameter with a predetermined value.

More specifically, the graph of the nonlinear function with the values of the parameters being identified tends to be shifted in its entirety into the leaner air-fuel ratio range as the deterioration of the catalytic converter progresses.

Therefore, one example of the evaluating parameter may be an evaluating parameter (hereinafter referred to as "first evaluating parameter") which changes as the graph of the nonlinear function with the values of the parameters being identified in the identifying step is shifted into the leaner air-fuel ratio range as the deterioration of the catalytic converter progresses.

More specifically, the first evaluating parameter may comprise the value of an air-fuel ratio which minimizes the concentration of the particular component represented by the function value of the nonlinear function.

Based on the fact that the concentration of the particular component detected by the exhaust gas sensor generally has a minimum value when the air-fuel ratio of the internal combustion engine changes, the concentration of the particular component represented by the function value of the nonlinear function also has a minimum value. When the graph of the nonlinear function is shifted into the leaner air-fuel ratio range as the deterioration of the catalytic converter progresses, the value of the air-fuel ratio which minimizes the concentration of the particular component represented by the function value of the nonlinear function changes to a value in the leaner air-fuel ratio range.

Thus, such value of the air-fuel ratio can be employed as the first evaluating parameter. The deteriorated state of the catalytic converter can appropriately be evaluated based on the first evaluating parameter.

The graph of the nonlinear function with the values of the parameters being identified tends to be shifted in its entirety in a direction to increase the concentration of the particular component represented by the function value of the nonlinear function as the deterioration of the catalytic converter processes. This is because as the deterioration of the catalytic converter processes, the purification rate of the particular component is lowered, increasing the concentration of the particular component detected by the exhaust gas sensor.

Another example of the evaluating parameter may be an evaluating parameter (hereinafter referred to as "second evaluating parameter") which changes as the graph of the nonlinear function with the values of the parameters being identified in the identifying step is shifted in the direction to increase the concentration of the particular component represented by the function value of the nonlinear function as the deterioration of the catalytic converter progresses.

The second evaluating parameter may comprise an extremal value (maximum or minimum value) of the function value of the nonlinear function which corresponds to a minimum value of the concentration of the particular component represented by the function value of the nonlinear function.

Specifically, as the deterioration of the catalytic converter progresses, the concentration of the particular component represented by the function value of the nonlinear function increases. Therefore, the extremal value of the function value of the nonlinear function which corresponds to the minimum value of the concentration changes similarly. If the extremal value of the nonlinear function is a minimum value, then the extremal value increases as the deterioration of the catalytic converter progresses. If the extremal value of the nonlinear function is a maximum value, then the extremal value decreases as the deterioration of the catalytic converter progresses.

Thus, the extremal value of the nonlinear function can be employed as the second evaluating parameter. The deteriorated state of the catalytic converter can appropriately be evaluated based on the second evaluating parameter.

According to the nonlinear function with the values of the parameters thereof being identified, as the deterioration of the catalytic converter progresses, the gradient of the graph of the nonlinear function increases in the air-fuel ratio range leaner or richer than, or basically in the air-fuel ratio ranges on both sides of, the value of the air-fuel ratio which minimizes the concentration of the particular component represented by the function value of the nonlinear function. This is because as the deterioration of the catalytic converter progresses, the air-fuel ratio range of the internal combustion engine which is capable of well purifying the particular component is reduced.

Still another example of the evaluating parameter may be an evaluating parameter (hereinafter referred to as "third evaluating parameter") which changes as the gradient of the graph of the nonlinear function in the air-fuel ratio range leaner or richer than the value of the air-fuel ratio which minimizes the concentration of the particular component represented by the function value of the nonlinear function with the values of the parameters thereof being identified in the identifying step, increases as the deterioration of the catalytic converter progresses.

Specifically, the third evaluating parameter may be the function value of the nonlinear function at the value of the air-fuel ratio changed a predetermined quantity into the leaner or richer air-fuel ratio range from the value of the air-fuel ratio which minimizes the concentration of the particular component represented by the function value of the nonlinear function.

When the gradient of the graph of the nonlinear function increases as the deterioration of the catalytic converter progresses, the function value of the nonlinear function increases or decreases at the value of the air-fuel ratio changed a predetermined quantity into the leaner or richer air-fuel ratio range from the value of the air-fuel ratio which minimizes the concentration of the particular component. In this case, if the extremal value of the nonlinear function corresponding to the minimum value of the concentration of the particular component is a minimum value, then the function value increases as the deterioration of the catalytic converter progresses. If the extremal value of the nonlinear function is a maximum value, then the function value decreases as the deterioration of the catalytic converter progresses.

Thus, the function value of the nonlinear function can be employed as the third evaluating parameter. The deteriorated state of the catalytic converter can appropriately be evaluated based on the third evaluating parameter.

The deteriorated state of the catalytic converter may be evaluated based on only one of the first, second, and third evaluating parameters. Preferably, however, the evaluating parameter determined in the evaluating step comprises a plurality of evaluating parameters, i.e., the first, second, and third evaluating parameters are determined. The step of evaluating the deteriorated state of the catalytic converter should preferably comprise the step of combining evaluations of the deteriorated state of the catalytic converter based on the plurality of evaluating parameters to evaluate the deteriorated state of the catalytic converter.

In this manner, the deteriorated state of the catalytic converter can be evaluated with increased reliability.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a block diagram of a system for carrying out a method of evaluating a deteriorated state of a catalytic converter according to a first embodiment of the present invention;

FIG. 2 is a diagram showing the output of an exhaust gas sensor (NOx sensor) used by the system shown in FIG. 1 depending on the concentration of NOx detected thereby;

FIG. 3 is a diagram showing the capabilities of the catalytic converter of the system shown in FIG. 1 to purify NOx;

FIG. 4 is a diagram showing the output of the exhaust gas sensor (NOx sensor) used by the system shown in FIG. 1 or the concentration of NOx detected by the exhaust gas sensor depending on the air-fuel ratio;

DETAILED DESCRIPTION OF THE PREFERRED EMBODIMENTS

Figure 5:
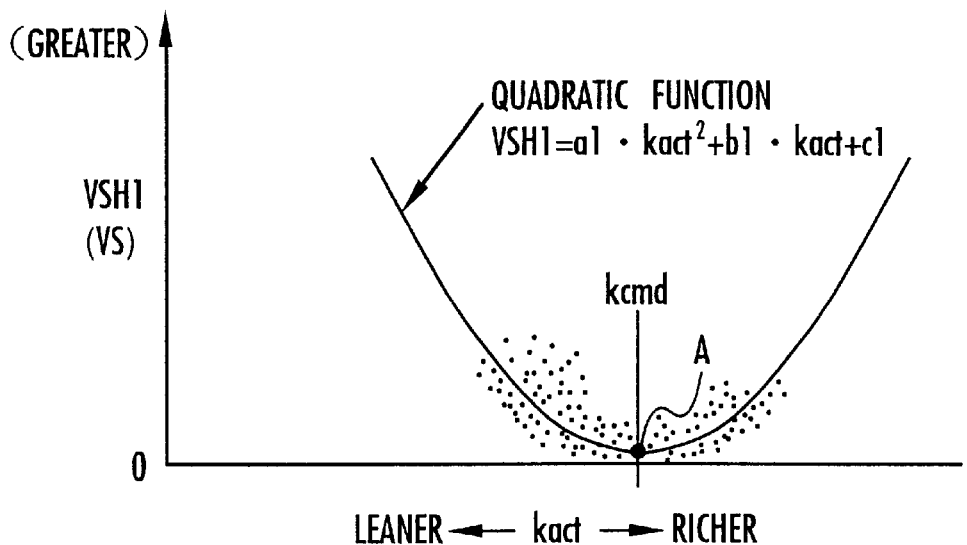
FIG. 5 is a diagram illustrative of the processing of a target air-fuel ratio calculating means in a main processing controller of the system shown in FIG. 1.

A method of evaluating a deteriorated state of a catalytic converter according to a first embodiment of the present invention will first be described below with reference to FIGS. 1 through 15.

FIG. 1 shows in block form a system for carrying out the method of evaluating a deteriorated state of a catalytic converter according to the first embodiment of the present invention. As shown in FIG. 1, an internal combustion engine 1 comprises a four-cylinder engine mounted as a propulsion source on an automobile or a hybrid vehicle. Exhaust gases produced by the engine 1 when an air-fuel mixture is combusted in each of the cylinders of the engine 1 are combined by a common exhaust pipe 2 (exhaust passage) near the engine 1, and discharged from the exhaust pipe 2 into the atmosphere.

The exhaust pipe 2 has a catalytic converter 3, such as a three-way catalytic converter, for purifying the exhaust gas flowing through the exhaust pipe 2. The catalytic converter 3 purifies HC (hydrocarbons) and NOx (nitrogen oxides) in the exhaust gas according to an oxidizing/reducing action.

An air-fuel ratio sensor 4 is mounted on the exhaust pipe 2 upstream of the catalytic converter 3, more specifically, in a region where exhaust gases from the cylinders of the engine 1 are combined together, and an exhaust gas sensor 5 is mounted on the exhaust pipe 2 down-stream of the catalytic converter 3.

The air-fuel ratio sensor 4 (hereinafter referred to as an "LAF sensor 4") generates an output KACT representing the detected value of an air-fuel ratio of an air-fuel mixture combusted by the engine 1, or more specifically, an air-fuel ratio recognized by an oxygen concentration in exhaust gases that are combinations of exhaust gases from the cylinders of the engine 1 (hereinafter referred to as an "air-fuel ratio of the engine 1"). The air-fuel ratio sensor 4 comprises a wide-range air-fuel ratio sensor described in detail in Japanese laid-open patent publication No. 4-369471 or U.S. Pat. No. 5,391,282. The air-fuel ratio sensor 4 generates an output KACT having a level proportional to the air-fuel ratio corresponding to the oxygen concentration in the exhaust gas in a relatively wide range of oxygen concentrations. That is, the output KACT of the air-fuel ratio sensor 4 changes linearly as the air-fuel ratio changes.

The exhaust gas sensor 5 comprises an NOx sensor for generating an output VS representing the detected value of an NOx concentration in the exhaust gas having passed through the catalytic converter 3, i.e., the concentration of NOx purified by the catalytic converter 3. As indicated by the solid-line curve in FIG. 2, the output VS of the exhaust gas sensor 5 has a level which increases linearly as the NOx concentration increases, i.e., substantially in proportion to the NOx concentration, and hence has positive characteristics.

Some NOx sensors have negative characteristics such that the output thereof has a level which decreases linearly as the NOx concentration increases, i.e., substantially in inverse proportion to the NOx concentration, as indicated by the imaginary-line curve in FIG. 2. In the illustrated embodiment, however, the exhaust gas sensor 5 has positive characteristics as indicated by the solid-line curve in FIG. 2.

The system according the present embodiment basically performs a control process of manipulating the air-fuel ratio of the engine 1 in order to maximize the purification rate at which NOx is purified by the catalytic converter 3 irrespective of the deteriorated state of the catalytic converter 3, or stated otherwise, in order to minimize the NOx concentration represented by the output VS of the exhaust gas sensor 5, i.e., the concentration of NOx purified by the catalytic converter 3. Concurrent with this control process, the system sequentially performs an evaluating process of evaluating the deteriorated state of the catalytic converter 3.

The system includes a main processing controller 6 and a fuel supply controller 7 for performing the control process and the evaluating process described above.

The main processing controller 6 has a function as an identifying means 6a for sequentially identifying the values of parameters of a quadratic function (nonlinear function) using sampled data of the output KACT of the LAF sensor 4 and the output VS of the exhaust gas sensor 5, a function as a target air-fuel ratio calculating means 6b for sequentially calculating a target air-fuel ratio KCMD of the engine 1, which is also a target value of the output KACT of the LAF sensor 4, to minimize the NOx concentration represented by the output VS of the exhaust gas sensor 5, using the values of the parameters which have been identified by the identifying means 6a, and a function as a deteriorated state evaluating means 6c for evaluating the deteriorated state of the catalytic converter 3 using the values of the parameters which have been identified by the identifying means 6a.

To the main processing controller 6, there is connected a deterioration indicator 8 for indicating an evaluation made of the deteriorated state of the catalytic converter 3 by the deteriorated state evaluating means 6c. The deterioration indicator 8 may comprise a lamp, a buzzer, or a display unit for displaying characters, a graphic image, etc.

The fuel supply controller 7 has a function as an air-fuel ratio manipulating means for manipulating the air-fuel ratio of the engine 1 by adjusting the quantity of fuel supplied to the engine 1, i.e., the quantity of fuel injected into the engine 1, in order to converge the output KACT of the LAE sensor 4, i.e., the detected value of the air-fuel ratio of the engine 1, to the target air-fuel ratio KCMD determined by the function as the target air-fuel ratio calculating means 6b of the main processing controller 6.

The fuel supply controller 7 is supplied with the output KACT of the LAF sensor 4, the output VS of the exhaust gas sensor 5, and also detected output signals from various other sensors for detecting a engine speed, an in-take pressure (a pressure in an intake pipe), a coolant temperature, etc. of the engine 1.

The controllers 6, 7 comprise a microcomputer, and perform their respective control processes in given control cycles. In the present embodiment, each of the control cycles in which the fuel supply controller 7 performs its process of adjusting the fuel injection quantity has a period in synchronism with a crankshaft angle period (so-called TDC) of the engine 1. Each of the control cycles in which the target air-fuel ratio calculating means 6b calculates a target air-fuel ratio has a predetermined period longer than the crankshaft angle period.

Prior to describing the controllers 6, 7, the characteristics of purification of NOx by the catalytic converter 3 will be described below.

The catalytic converter 3 basically has the characteristics of purification of NOx, i.e., the characteristics of the purification rate of NOx, with respect to changes in the air-fuel ratio of the engine 1, as shown in FIG. 3. Specifically, a solid-line curve shown in FIG. 3 represents a brand-new catalytic converter 3, and broken-line and dot-and-dash-line curves shown in FIG. 3 represent deteriorated catalytic converters 3. More specifically, the broken-line curve represents a catalytic converter 3 which is deteriorated to a relatively small extent, and the dot-and-dash-line curve represents a catalytic converter 3 which is deteriorated to a relatively large extent.

As indicated by the solid-line curve in FIG. 3, the purification rate of NOx by the brand-new catalytic converter 3 is of a substantially constant maximum level (substantially 100%) when the air-fuel ratio of the engine 1 is in an air-fuel ratio range richer than a certain value AF1, and sharply drops when the air-fuel ratio of the engine 1 is in an air-fuel ratio range leaner than the value AF1.

When the catalytic converter 3 is deteriorated to a certain extent, as indicated by the broken-line and dot-and-dash-line curves in FIG. 3, the purification rate of NOx has a maximum value, i.e., a peak, at a certain air-fuel ratio AF2 (the broken-line curve) or a certain air-fuel ratio AF3 (the dot-and-dash-line curve). Furthermore, the purification rate of NOx decreases when the air-fuel ratio of the engine 1 changes to a richer range or a leaner range from the air-fuel ratio AF2 or AF3 which corresponds to the maximum purification rate of NOx. The reduction from the maximum value of the purification rate of NOx is relatively sharp, i.e., the gradient of the curves is large, in the leaner air-fuel ratio range, and is relatively gradual, i.e., the gradient of the curves is small, in the richer air-fuel ratio range. The maximum value of the purification rate of NOx when the catalytic converter 3 is deteriorated is smaller than the maximum value of the purification rate of NOx when the catalytic converter 3 is brand-new. The maximum value of the purification rate of NOx becomes smaller as the catalytic converter 3 is progressively deteriorated.

Therefore, the purification rate of NOx purified by the catalytic converter 3 has such characteristics that it basically has a maximum value as the air-fuel ratio of the engine 1 changes, except when the catalytic converter 3 is brand-new.

In the various deteriorated states of the catalytic converter 3, including the brand-new state of the catalytic converter 3, the purification rate of other components than NOx purified by the catalytic converter 3, e.g., the purification rate of HC (described later on in another embodiment), is also approximately maximum at the air-fuel ratios AF1, AF2, AF3 where the purification rate of NOx is maximum. Those air-fuel ratios AF1, AF2, AF3 are basically shifted into the leaner air-fuel ratio range as the deterioration of the catalytic converter 3 progresses. Furthermore, the purification rate of NOx changes sharply, i.e., the curves of the purification rate of NOx become convex more sharply, in the vicinity of the air-fuel ratios AF1, AF2, AF3 basically as the deterioration of the catalytic converter 3 progresses.

In view of those purification characteristics of the catalytic converter 3, the characteristics of the output VS of the exhaust gas sensor 5 (NOx sensor) with respect to changes in the air-fuel ratio of the engine 1 will be described below. The characteristics of the purification rate achieved by the catalytic converter 3 and the output VS of the exhaust gas sensor 5 with respect to the air-fuel ratio of the engine 1 will also be referred to as "air-fuel ratio-related characteristics".

Since the catalytic converter 3 has the above NOx purification characteristics, the NOx concentration detected by the exhaust gas sensor 5 (NOx sensor) downstream of the catalytic converter 3, i.e., the NOx concentration of the exhaust gas that has been purified by the catalytic converter 3, is basically of such characteristics representing a vertical reversal of the characteristic curves shown in FIG. 3, with respect to changes in the air-fuel ratio of the engine 1, as shown in FIG. 4. Accordingly, the air-fuel ratio-related characteristics of the NOx concentration basically have minimum values as indicated by the broken-line and dot-and-dash-line concave curves in FIG. 4, except when the catalytic converter 3 is brand-new as represented by the solid-line curve shown in FIG. 4.

Because the output characteristics of the exhaust gas sensor 5 with respect to the NOx concentration are positive characteristics as described above, the air-fuel ratio-related characteristics of the output VS of the exhaust gas sensor 5 are also the same as the characteristics of the NOx concentration shown in FIG. 4. Specifically, the air-fuel ratio-related characteristics of the output VS of the exhaust gas sensor 5, except when the catalytic converter 3 is brand-new, or when the catalytic converter 3 is somewhat deteriorated, are such that the output VS of the exhaust gas sensor 5 has minimum values as indicated by the concave curves in FIG. 4 at the air-fuel ratios AF2, AF3 of the engine 1 where the purification rate of NOx by the catalytic converter 3 is maximum, as indicated by the broken-line and dot-and-dash-line curves in FIG. 4. When the catalytic converter 3 is brand-new, as indicated by the solid-line curve in FIG. 4, in an air-fuel ratio range richer than the air-fuel ratio AF1, i.e., in an air-fuel ratio range where the purification rate of NOx is kept at a substantially constant maximum level (about 100%), the output VS of the exhaust gas sensor 5 is kept at a substantially constant minimum level (about 0 V). When the air-fuel ratio of the engine 1 changes to a value leaner than the value AF1, the output VS of the exhaust gas sensor 5 increases sharply.

The air-fuel ratios AF1, AF2, AF3 of the engine 1 where the output VS of the exhaust gas sensor 5 is minimum are shifted into the leaner air-fuel ratio range as the deterioration of the catalytic converter 3 progresses. The output VS of the exhaust gas sensor 5 at the various values of the air-fuel ratio of the engine 1, including the minimum values thereof, increases as the deterioration of the catalytic converter 3 progresses. The gradients of the curves of the air-fuel ratio-related characteristics of the output VS of the exhaust gas sensor 5 in the air-fuel ratio ranges on both sides of the air-fuel ratios AF1, AF2, AF3 of the engine 1 where the output VS of the exhaust gas sensor 5 is minimum, increase as the deterioration of the catalytic converter 3 progresses.

Based on the purification characteristics of the catalytic converter 3 and the air-fuel ratio-related characteristics of the output VS of the exhaust gas sensor 5 (NOx sensor), the main processing controller 6 and the fuel supply controller 7 will be described below.

First, the process performed by the main processing controller 6 will briefly be described below. In the present embodiment, for the purposes of calculating the target air-fuel ratio KCMD and evaluating the deteriorated state of the catalytic converter 3, the air-fuel ratio-related characteristics of the output VS of the exhaust gas sensor 5 are approximately expressed by a quadratic function as a nonlinear function, or stated essentially equivalently, the air-fuel ratio-related characteristics of NOx detected by the exhaust gas sensor 5 are approximately expressed by a quadratic function.

Based on its function as the identifying means 6a, the main processing controller 6 sequentially identifies parameters that determine the graphic presentation of the quadratic function, i.e., the coefficients of terms of different degrees and the values of constant terms of the quadratic function, in each control cycle of the main processing controller 6, using sampled data of the output KACT (the detected value of the air-fuel ratio of the engine 1) of the LAF sensor 4 and the output VS of the exhaust gas sensor 5.

Furthermore, based on its function as the target air-fuel ratio calculating means 6b, the main processing controller 6 sequentially determines the target air-fuel ratio KCMD of the engine 1 according to the quadratic function with the identified values of the parameters. Based on its function as the deteriorated state evaluating means 6c, the main processing controller 6 determines a plurality of (three in this embodiment) deterioration evaluating parameters for evaluating the deteriorated state of the catalytic converter 3 from the identified values of the parameters of the quadratic function, and evaluates the deteriorated state of the catalytic converter 3 based on the values of the deterioration evaluating parameters.

More specifically, the quadratic function which approximately expresses the air-fuel ratio-related characteristics of the output VS of the exhaust gas sensor 5 is given as a quadratic function having an independent variable represented by the output KACT of the LAF sensor 4 which indicates the detected value of the air-fuel ratio of the engine 1 and a dependent variable represented by the output VS of the exhaust gas sensor 5. In order to express the quadratic function as an equation, instead of directly using the output KACT of the LAF sensor 4 (the detected value of the air-fuel ratio) as the independent variable, the difference kact (=KACT−FLAF/BASE, hereinafter referred to as "differential air-fuel ratio kact") between the output KACT and a predetermined reference value FLAF/BASE (hereinafter referred to as "air-fuel ratio reference value FLAF/BASE") is used, and the quadratic function is defined according to the equation (1) shown below. In the present embodiment, the air-fuel ratio reference value FLAF/BASE is represented by a stoichiometric air-fuel ratio, for example.

$$VSH1 = a1 \cdot (KACT - FLAF/BASE)^2 + b1 \cdot (KACT - FLAF/BASE) + c1 = a1 \cdot kact^2 + b1 \cdot kact + c1 \tag{1}$$

where kact=KACT−FLAF/BASE.

In the equation (1), in order to distinguish the function value (the calculated value of the right side of the equation (1)) which is the value of the dependent variable of the quadratic function from the actual output VS of the exhaust gas sensor 5, the output of the exhaust gas sensor 5 as the dependent variable of the quadratic function is denoted by "VSH1" rather than "VS". In the description given below, the output of the exhaust gas sensor 5 denoted by "VSH1" is referred to as "function output VSH1".

In the equation (1) of the quadratic function, the coefficient a1 of the term "$kact^2$" of second degree, the coefficient b1 of the term "kact" of first degree, and the constant term c1 are parameters whose values are to be identified by the function as the identifying means 6a of the main processing controller 6. The identifying means 6a of the main processing controller 6 identifies the values of the above parameters a1, b1, c1 according to a sequential identifying algorithm that is constructed as follows:

According to the sequential identifying algorithm, in each control cycle of the main processing controller 6, a function output VSH1(k) of the exhaust gas sensor 5 in each control cycle is determined according to the equation (2) given below, using a differential air-fuel ratio kact(k) produced by subtracting the air-fuel ratio reference value FLAF/BASE from a present value KACT(k) of the output of the LAF sensor 4 (k represents the ordinal number of a control cycle)

and present identified values a1(k), b1(k), c1(k) of the parameters a1, b1, c1, which are basically the identified values of the parameters a1, b1, c1 determined in a preceding control cycle.

$$VSH1(k) = a1(k) \cdot kact(k)^2 + b1(k) \cdot kact(k) + c1(k) = \Theta1^T(k) \cdot \xi1(k) \quad (2)$$

where $\Theta1^T(k) = [a1(k)\ b1(k)\ c1(k)]$ $\xi1^T(k) = [kact(k)^2\ kact(k)\ 1]$ In the equation (2), $\Theta1$, $\xi1$ represent vectors defined therein, and T represents a transposition.

An identified error ID/E1(k) given as the difference between the function output VSH1(k) and an actual output VS(k) of the exhaust gas sensor 5 in the present control cycle is determined according to the following equation (3):

$$ID/E1(k) = VS(k) - VSH1(k) \quad (3)$$

The sequential identifying algorithm that is carried out by the identifying means 6a of the main processing controller 6 determines new identified values a1(k+1), b1(k+1), c1(k+1) of the parameters a1, b1, c1, or stated otherwise a new vector $\Theta1(k+1)$ having these new identified values as its components (hereinafter referred to as "identified parameter vector $\Theta1$"), in order to minimize the identified error ID/E1. The new identified parameter vector $\Theta1$ is calculated, i.e., the identified values of the parameters a1, b1, c1 are updated, according to the following equation (4):

$$\Theta1(k+1) = \Theta1(k) + Kp1(k) \cdot ID/E1(k) \quad (4)$$

Specifically, the identified values a1(k+1), b1(k+1), c1(k+1) of the parameters a1, b1, c1 are determined by changing the present identified values a1(k), b1(k), c1(k) of the parameters a1, b1, c1, which are the identified values determined in the preceding control cycle, by a quantity proportional to the identified error ID/E1(k) in the present control cycle.

In the equation (4), "Kp1(k)" represents a cubic vector determined according to the equation (5) given below in each control cycle, and determines a rate of change (gain) of the identified values of the parameters a1, b1, c1 depending on the identified error ID/E1.

$$Kp1(k) = \frac{P1(k) \cdot \xi1(k)}{1 + \xi1^T(k) \cdot P1(k) \cdot \xi1(k)} \quad (5)$$

where P1(k) represents a cubic square matrix updated in each control cycle by a recursive formula expressed by the following equation (6):

$$P(k+1) = \frac{1}{\lambda1}\left(I - \frac{\lambda2 \cdot P1(k) \cdot \xi1(k) \cdot \xi1^T(k)}{\lambda1 + \lambda2 \cdot \xi1^T(k) \cdot P1(k) \cdot \xi1(k)}\right) \cdot P1(k) \quad (6)$$

where I represents a unit matrix, an initial value P1(0) of the matrix P1(k) represents a diagonal matrix whose each diagonal component is a positive number, and $\lambda1$, $\lambda2$ are established to satisfy the conditions $0 < \lambda1 \leq 1$ and $0 \leq \lambda2 < 2$.

Depending on how $\lambda1$, $\lambda2$ in the equation (6) are established, any one of various specific identifying algorithms including a sequential method of least squares, a sequential method of weighted least squares, a fixed gain method, a degressive gain method, etc. may be employed. According to the present embodiment, an identifying algorithm according to a sequential method of least squares ($\lambda1 = \lambda2 = 1$), for example, is employed.

The algorithm described above is the sequential identifying algorithm for the identifying means 6a to identify the values of the parameters a1, b1, c1 of the quadratic function.

In the present embodiment, an additional process of limiting the identified value of the parameter a1 which is the coefficient of the term of second degree of the quadratic function is performed in identifying the values of the parameters a1, b1, c1. Such an additional process will be described later on.

Then, the target air-fuel ratio calculating means 6b of the main processing means 6 determines in each control cycle a target air-fuel ratio KCMD of the engine 1, which is also a target value of the air-fuel ratio detected by the LAF sensor 4, using the quadratic function with the values of the parameters a1, b1, c1 thereof being identified as described above.

More specifically, when the values of the parameters a1, b1, c1 of the quadratic function are identified as described above, the graphic presentation of the quadratic function determined by the identified values approximates the graphic presentation of the air-fuel ratio-related characteristics of the output VS of the exhaust gas sensor 5. At this time, since the air-fuel ratio-related characteristics of the output VS of the exhaust gas sensor 5 are basically characteristics having minimum values, i.e., characteristics represented by concave curves, as described above, the graphic presentation of the quadratic function determined by the identified values of the parameters a1, b1, c1 are also characteristics having minimum values.

For example, sampled data of the output VS of the exhaust gas sensor 5 and the differential air-fuel ratio kact (=KACT−FLAF/BASE) according to the LAF sensor 4 are obtained with a tendency indicated by dots in FIG. 5 when the catalytic converter 3 is in a certain deteriorated state. At this time, the graph of the quadratic function determined by the identified values of the parameters a1, b1, c1 is of a concave shape as indicated by the solid-line curve in FIG. 5.

In the present embodiment, basically, the air-fuel ratio of the engine 1 which minimizes the output VS of the exhaust gas sensor 5, i.e., the air-fuel ratio which minimizes the NOx concentration recognized from the output VS of the exhaust gas sensor 5, is determined as the target air-fuel ratio KCMD.

The target air-fuel ratio calculating means 6b basically determines the value of the differential air-fuel ratio kact which minimizes the function value (the function output VSH1) of the above quadratic function, i.e., the value of the differential air-fuel ratio kact at a point A in FIG. 5, as a target value of the difference between the air-fuel ratio detected by the LAF sensor 4 and the air-fuel ratio reference value FLAF/BASE, i.e., the difference between the target air-fuel ratio KCMD and the air-fuel ratio reference value FLAF/BASE (=KCMD−FLAF/BASE, hereinafter referred to as "target differential air-fuel ratio kcmd").

The target differential air-fuel ratio kcmd can be determined using the identified values of the parameters a1, b1, specifically, latest identified values a1(k+1), b1(k+1) thereof, among the parameters a1, b1, c1 of the quadratic function, according to the following equation (7):

$$kcmd = -\frac{b1}{2 \cdot a1} \quad (7)$$

The target air-fuel ratio calculating means 6b basically adds the air-fuel ratio reference value FLAF/BASE to the target differential air-fuel ratio kcmd determined according to the equation (7), thus determining the target air-fuel ratio KCMD in each control cycle.

As described above, when the catalytic converter 3 is brand-new, the air-fuel ratio-related characteristics of the output VS of the exhaust gas sensor 5 have no minimum value. In this case, sampled data of the output VS of the exhaust gas sensor 5 and the differential air-fuel ratio kact (=KACT−FLAF/BASE) are obtained with a tendency indicated by dots in FIG. 6. At this time, the graph of the quadratic function determined by the identified values of the parameters a1, b1, c1 is given as indicated by the solid-line curve in FIG. 6.

In this case, if the value of the differential air-fuel ratio kact corresponding to the minimum value of the function value of the quadratic function is determined as the target differential air-fuel ratio kcmd, then the target air-fuel ratio KCMD produced by adding the air-fuel ratio reference value FLAF/BASE to the-target differential air-fuel ratio kcmd is of a value in an air-fuel ratio range in which the output VS of the exhaust gas sensor 5 is kept at a substantially constant level, i.e., the purification rate of NOx by the catalytic converter 3 is kept at a substantially constant maximum level (substantially 100%).

The target air-fuel ratio KCMD of such a value does not pose problems in maintaining a desired NOx purification capability, but generally tends to lower the purification rates of other gas components by the catalytic converter 3. For example, as described in detail later on with respect to another embodiment, the purification rate of HC by the catalytic converter 3 which is brand-new is at a substantially constant maximum level in an air-fuel ratio range leaner than a value that is substantially equal to the air-fuel ratio AF1 in FIG. 3, and drops in an air-fuel ratio range richer than that value.

If the catalytic converter 3 is brand-new and the air-fuel ratio-related characteristics of the output VS of the exhaust gas sensor 5 have no minimum value, the minimum value of the quadratic function determined by the identified values of the parameters a1, b1, c1 is a negative value which the actual output VS of the exhaust gas sensor 5 cannot take, i.e., a value smaller than the output VS of the exhaust gas sensor 5 when the NOx concentration is substantially "0".

Figure 6:
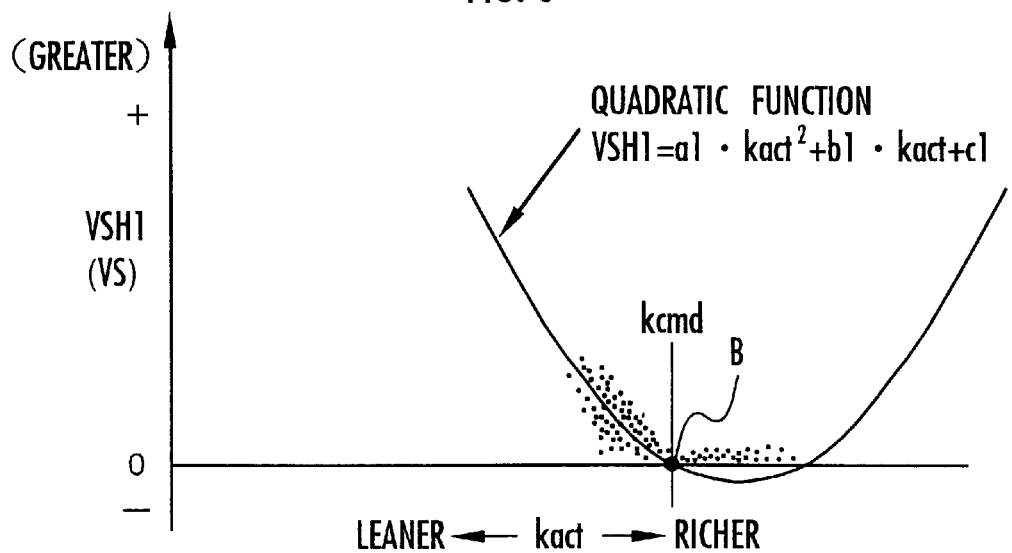
FIG. 6 is a diagram illustrative of the processing of the target air-fuel ratio calculating means in the main processing controller of the system shown in FIG. 1.

According to the present embodiment, therefore, if the minimum value of the quadratic function determined by the identified values of the parameters a1, b1, c1 is a negative value, then the target air-fuel ratio calculating means 6b determines one of two values of the differential air-fuel ratio kact at which the function value of the quadratic function (the function output VSH1 of the exhaust gas sensor 5) is "0", which one of the two values is in the leaner air-fuel ratio range (the value of the differential air-fuel ratio kact at a point B in FIG. 6), as the target differential air-fuel ratio kcmd.

The minimum value of the quadratic function becomes negative if the identified values of the parameters a1, b1, c1 satisfy the inequality: $b1^2 - 4 \cdot a1 \cdot c1 > 0$. The target differential air-fuel ratio kcmd in this case is determined using the identified values of the parameters a1, b1, c1, specifically, latest identified values a1(k+1), b1(k+1), c1(k+1) thereof, according to the following equation (8):

$$kcmd = \frac{-b1 - \sqrt{b1^2 - 4 \cdot a1 \cdot c1}}{2 \cdot a1} \tag{8}$$

If the minimum value of the quadratic function is "0" or a positive value, then the value of the differential air-fuel ratio kact corresponding to the minimum value of the quadratic function is determined as the target differential air-fuel ratio kcmd.

Specifically, according to the present embodiment, the target air-fuel ratio calculating means 6b determines, in each control cycle, the target differential air-fuel ratio kcmd(k) depending on the value of a criterion formula $(b1^2 - 4 \cdot a1 \cdot c1)$ determined by the identified values a1(k+1), b1(k+1), c1(k+1) of the parameters a1, b1, c1 of the quadratic function that have been determined by the identifying means 6a as described above, according to the following equations (9):

When $$b1^2 - 4 \cdot a1 \cdot c1 \leq 0,$$

$$kcmd = -\frac{b1}{2 \cdot a1}$$

When $$b1^2 - 4 \cdot a1 \cdot c1 > 0,$$

$$kcmd = \frac{-b1 - \sqrt{b1^2 - 4 \cdot a1 \cdot c1}}{2 \cdot a1} \tag{9}$$

$$(a1 = a1(k+1), b1 = b1(k+1), c1 = c1(k+1))$$

Then, the target air-fuel ratio calculating means 6b determines the target air-fuel ratio KCMD(k) in each control cycle by adding the air-fuel ratio reference value FLAF/BASE to the target differential air-fuel ratio kcmd(k) thus determined, according to the following equation (10):

$$KCMD = kcmd + FLAF/BASE \tag{10}$$

The above process is the basic process performed by the target air-fuel ratio calculating means 6b of the main processing controller 6.

Then, the deteriorated state evaluating means 6c of the main processing controller 6 evaluates the deteriorated state of the catalytic converter 3 in each control cycle of the main processing controller 6, using the identified values of the parameters a1, b1, c1 of the quadratic function, according to an algorithm constructed as described below.

Figure 7:
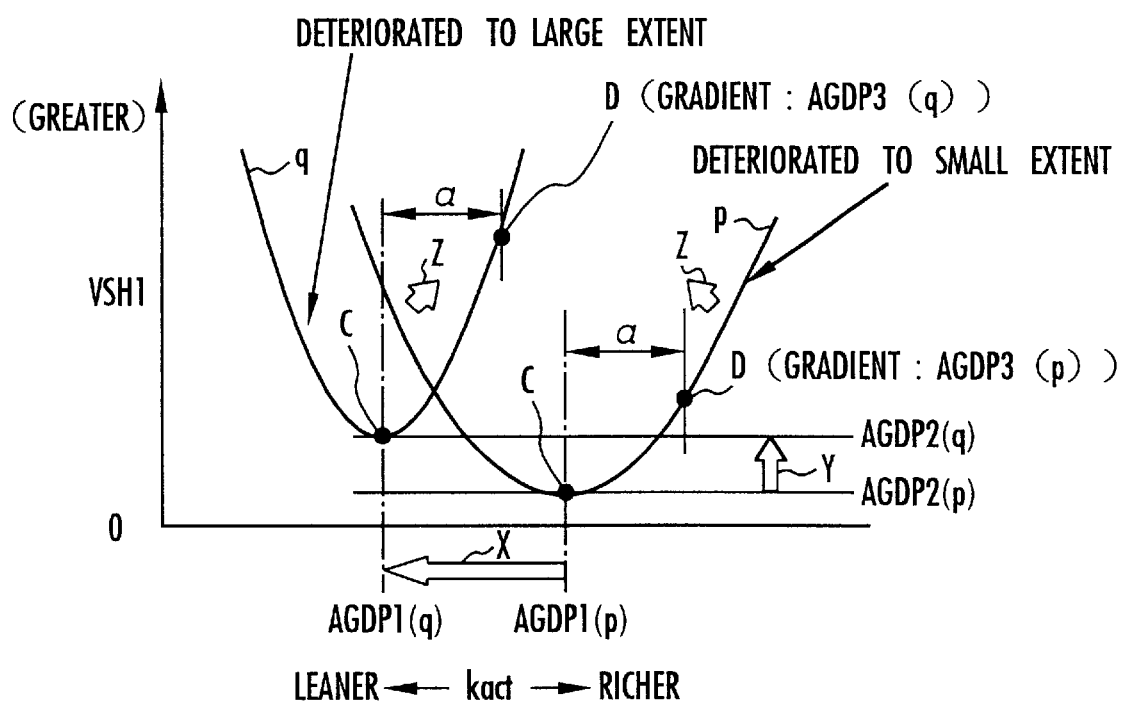
FIG. 7 is a diagram illustrative of the processing of a deteriorated state evaluating means in the main processing controller of the system shown in FIG. 1.

As the deterioration of the catalytic converter 3 progresses, the output VS of the exhaust gas sensor 5 or the air-fuel ratio-related characteristics of the NOx concentration represented by the output VS changes as described above (see FIG. 4). Therefore, as the deterioration of the catalytic converter 3 progresses, the graph of the quadratic function approximating the air-fuel ratio-related characteristics of the NOx concentration exhibits the following characteristic change: FIG. 7 conceptually shows how the graph of the quadratic function changes as the deterioration of the catalytic converter 3 progresses, using two specific graphs p, q which indicate relatively small and large degradations, respectively, of the catalytic converter 3.

As shown in FIG. 7, as the deterioration of the catalytic converter 3 progresses, the graph of the quadratic function with the identified values of the parameters a1, b1, c1 is shifted as a whole into the leaner air-fuel ratio range, as indicated by the arrow X. If the value of the differential air-fuel ratio kact at a minimum point C of the graph of the quadratic function is represented by AGDP1 (with suffixes (p), (q) corresponding to the graphs p, q in FIG. 7), then the value AGDP1 or the value of the air-fuel ratio of the engine 1 produced by adding the air-fuel ratio reference value FLAF/BASE to the value AGDP1 is shifted into the leaner air-fuel ratio range, i.e., the value AGDP1 becomes smaller, as the deterioration of the catalytic converter 3 progresses. This corresponds to the fact that the air-fuel ratio of the engine 1 which minimizes the actual NOx concentration detected by the exhaust gas sensor 5, i.e., the NOx concentration of the exhaust gas purified by the catalytic converter 3, is shifted into the leaner air-fuel ratio range as the deterioration of the catalytic converter 3 progresses.

Basically, as described above, the value AGDP1 becomes the target differential air-fuel ratio kcmd.

As the deterioration of the catalytic converter 3 progresses, the graph of the quadratic function is shifted as a whole in a direction to increase the function value (the function output VSH1) of the quadratic function, i.e., in a direction to increase the NOx concentration indicated by the function value, as indicated by the arrow Y. If the function value at the minimum point C of the graph of the quadratic function, i.e., the minimum value of the function value (the minimum value of the function output VSH1), is represented by AGDP2 (with suffixes (p), (q) corresponding to the graphs p, q in FIG. 7), then the value AGDP2 becomes larger as the deterioration of the catalytic converter 3 progresses. This corresponds to the fact that the minimum value of the actual NOx concentration detected by the exhaust gas sensor 5 becomes larger as the deterioration of the catalytic converter 3 progresses.

The gradients of the graph of the quadratic function on the both side of the minimum point C, or more specifically, the gradients of the graph in both the air-fuel ratio ranges leaner and richer than the differential air-fuel ratio kact at the minimum point C, become greater as the deterioration of the catalytic converter 3 progresses, as indicated by the arrow Z. Stated otherwise, the width of the graph of the quadratic function decreases as the deterioration of the catalytic converter 3 progresses. If the gradient of the graph of the quadratic function at a value (AGDP1+α), i.e., at a point D in FIG. 7, which is achieved by changing the air-fuel ratio from the value AGDP1 of the differential air-fuel ratio kact at the minimum point C of the quadratic function into the richer air-fuel ratio range by a given change α, is represented by AGDP3 (with suffixes (p), (q) corresponding to the graphs p, q in FIG. 7), then the value AGDP3 increases as the deterioration of the catalytic converter 3 progresses. This corresponds to the fact that the gradient of the graph of the air-fuel ratio-related characteristics of the NOx concentration in the air-fuel ratio range that lies across the air-fuel ratio of the engine 1 which minimizes the actual NOx concentration detected by the exhaust gas sensor 5 becomes larger as the deterioration of the catalytic converter 3 progresses, or stated otherwise, corresponds to the fact that the air-fuel ratio range in which the actual NOx concentration detected by the exhaust gas sensor 5 is of a minimum value or a value close thereto is narrowed.

The algorithm of the deteriorated state evaluating means 6c is constructed in view of the manner in which the graph of the quadratic function changes as the deterioration of the catalytic converter 3 progresses as described above.

More specifically, the value AGDP1 of the differential air-fuel ratio kact at the minimum point C of the quadratic function, the minimum value AGDP2 of the function value (the function output VSH1) of the quadratic function, and the gradient AGDP3 of the graph at the point D of the quadratic function are used as three deterioration evaluating parameters for evaluating the deteriorated state of the catalytic converter 3. The values of the deterioration evaluating parameters AGDP1, AGDP2, AGDP3 are determined using the identified values of the parameters a1, b1, c1 of the quadratic function according to the following respective equations (11), (12), (13):

$$AGDP1 = -\frac{b1}{2 \cdot a1} \quad (11)$$

$$AGDP2 = c1 - \frac{b1^2}{4 \cdot a1} \quad (12)$$

$$AGDP3 = 2 \cdot \alpha \cdot a1 \quad (13)$$

When the deterioration evaluating parameters AGDP2, AGDP2, AGDP3 (which will hereinafter be referred to as "first, second, and third deterioration evaluating parameters", respectively) are determined as described above, the value of the first deterioration evaluating parameter AGDP1 decreases as the deterioration of the catalytic converter 3 progresses, and the values of the second and third deterioration evaluating parameters AGDP2, AGDP3 increase as the deterioration of the catalytic converter 3 progresses. In the present embodiment, the deteriorated state of the catalytic converter 3 is evaluated to judge whether the catalytic converter 3 is in a state where it has been deteriorated to the extent that it needs to be replaced immediately or soon (such a deteriorated state will hereinafter be referred to as "deterioration-in-progress state", or not (a state of the catalytic converter 3 which is not in the deterioration-in-progress state will hereinafter be referred to as "non-deteriorated state").

The deteriorated state evaluating means 6c of the main processing controller 6 compares, in each control cycle of the main processing controller 6, the values of the first through third deterioration evaluating parameters AGDP1, AGDP2, AGDP3, which are determined from the identified values of the parameters a1, b1, c1 of the quadratic function (more specifically, the latest identified values a1(k+1), b1(k+1), c1(k+1)) according to the above equations (11) through (13), with respective predetermined thresholds LMT1, LMT2, LMT3 corresponding to those first through third deterioration evaluating parameters, for thereby temporarily determining whether the catalytic converter 3 is in the deterioration-in-progress state or the non-deteriorated state with respect to each of the first through third deterioration evaluating parameters AGDP1, AGDP2, AGDP3. If the catalytic converter 3 is in the deterioration-in-progress state with respect to each of the first through third deterioration evaluating parameters AGDP1, AGDP2, AGDP3, then the catalytic converter 3 is judged as being in the deterioration-in-progress state.

The above process is the algorithm used by the deteriorated state evaluating means 6c to evaluate the deteriorated state of the catalytic converter 3.

The fuel supply controller 7 will be described below.

Figure 8:
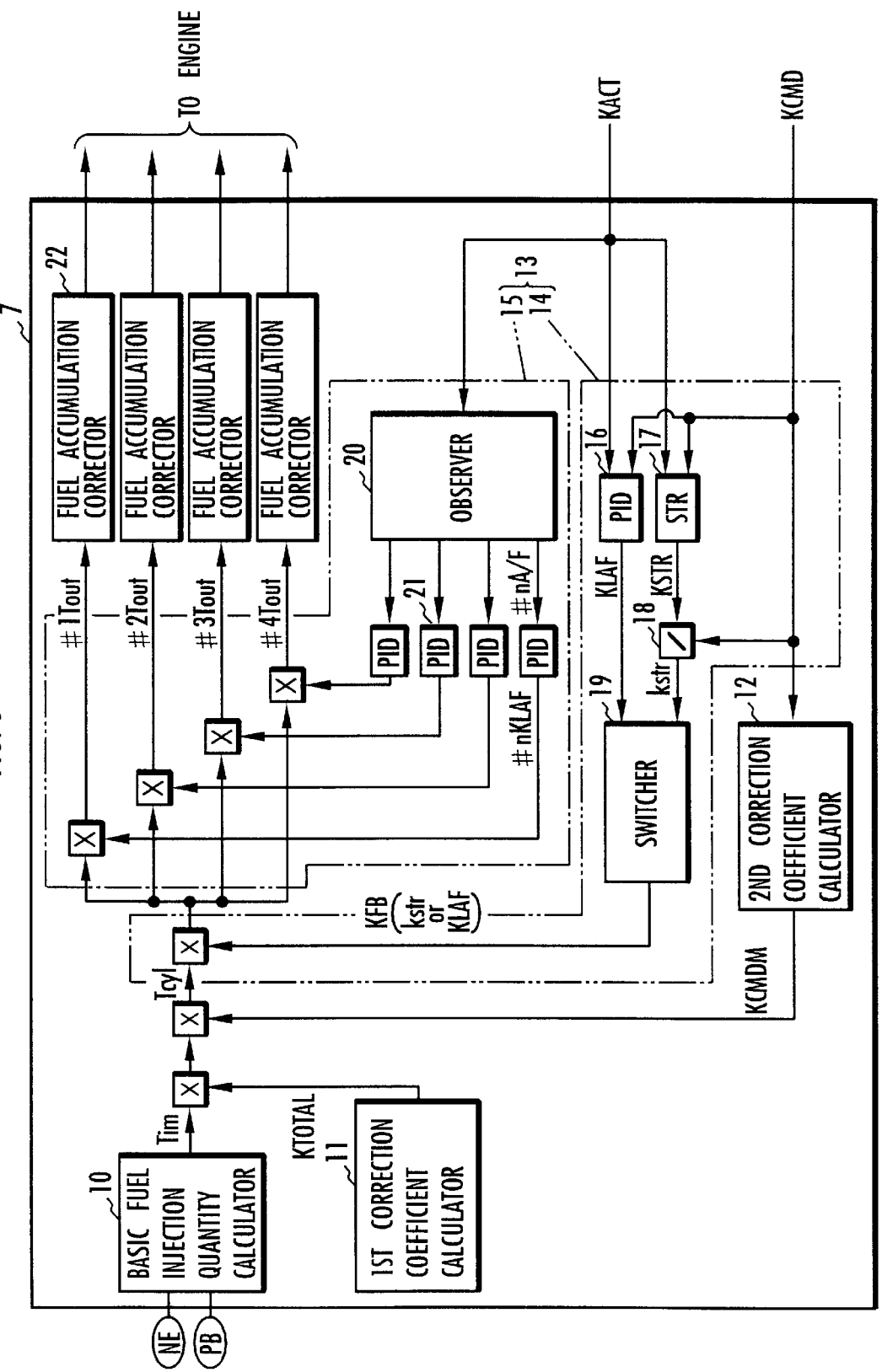
FIG. 8 is a block diagram of a basic arrangement of a fuel supply controller of the system shown in FIG. 1.

As shown in FIG. 8, the fuel supply controller 7 has, as its functions, a basic fuel injection quantity calculator 10 for determining a basic fuel injection quantity Tim to be injected into the engine 1, a first correction coefficient calculator 11 for determining a first correction coefficient KTOTAL to correct the basic fuel injection quantity Tim, and a second correction coefficient calculator 12 for determining a second correction coefficient KCMDM to correct the basic fuel injection quantity Tim.

The basic fuel injection quantity calculator 10 determines a reference fuel injection quantity (fuel supply quantity) for the engine 1 from the rotational speed NE and intake pressure PB of the engine 1 using a predetermined map, and corrects the determined reference fuel injection quantity depending on the effective opening area of a throttle valve (not shown) of the engine 1, thereby calculating a basic fuel injection quantity Tim.

The first correction coefficient KTOTAL determined by the first correction coefficient calculator 11 serves to correct the basic fuel injection quantity Tim in view of an exhaust gas recirculation ratio of the engine 1, i.e., the proportion of an exhaust gas contained in an air-fuel mixture introduced into the engine 1, an amount of purged fuel supplied to the engine 1 when a canister (not shown) is purged, a coolant temperature, an intake temperature, etc. of the engine 1.

The second correction coefficient KCMDM determined by the second correction coefficient calculator 12 serves to correct the basic fuel injection quantity Tim in view of the charging efficiency of an air-fuel mixture due to the cooling effect of fuel flowing into the engine 1 depending on a target air-fuel ratio KCMD generated by the target air-fuel ratio calculating means 6b.

The fuel supply controller 7 corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 or U.S. Pat. No. 5,253,630, and will not be described below.

The fuel supply controller 7 also has, in addition to the above functions, a feedback controller 13 for adjusting a fuel injection quantity for the engine 1 according to a feedback control process so as to converge the output KACT of the LAF sensor 4 toward the target air-fuel ratio KCMD which is sequentially generated by the exhaust system controller 6.

The feedback controller 13 comprises a general feedback controller 14 for controlling a total air-fuel ratio for the cylinders of the engine 1 and a local feedback controller 15 for feedback-controlling an air-fuel ratio for each of the cylinders of the engine 1.

The general feedback controller 14 sequentially determines a feedback correction coefficient KFB to correct the demand fuel injection quantity Tcyl (by multiplying the demand fuel injection quantity Tcyl) so as to converge the output KACT from the LAF sensor 4 toward the target air-fuel ratio KCMD.

The general feedback controller 14 comprises a PID controller 16 for generating a feedback manipulated variable KLAF as the feedback correction coefficient KFB depending on the difference between the output KACT from the LAF sensor 4 and the target air-fuel ratio KCMD according to a known PID control process, and an adaptive controller 17 (indicated by "STR" in FIG. 8) for adaptively determining a feedback manipulated variable KSTR for determining the feedback correction coefficient KFB in view of changes in operating conditions of the engine 1 and characteristic changes thereof from the output KACT from the LAF sensor 4 and the target air-fuel ratio KCMD.

In the present embodiment, the feedback manipulated variable KLAF generated by the PID controller 16 is of "1" and can be used directly as the feedback correction coefficient KFB when the output KACT (the detected air-fuel ratio of then engine 1) from the LAF sensor 4 is equal to the target air-fuel ratio KCMD. The feedback manipulated variable KSTR generated by the adaptive controller 17 becomes the target air-fuel ratio KCMD when the output KACT from the LAF sensor 4 is equal to the target air-fuel ratio KCMD. A feedback manipulated variable kstr (=KSTR/KCMD) which is produced by dividing the feedback manipulated variable KSTR by the target air-fuel ratio KCMD with a divider 18 can be used as the feedback correction coefficient KFB.

The feedback manipulated variable KLAF generated by the PID controller 16 and the feedback manipulated variable kstr which is produced by dividing the feedback manipulated variable KSTR from the adaptive controller 17 by the target air-fuel ratio KCMD are selected one at a time by a switcher 19. A selected one of the feedback manipulated variable KLAF and the feedback manipulated variable kstr is used as the feedback correction coefficient KFB. The demand fuel injection quantity Tcyl is corrected by being multiplied by the feedback correction coefficient KFB. Details of the general feedback controller 14 (particularly, the adaptive controller 17) will be described later on.

The local feedback controller 15 comprises an observer 20 for estimating real air-fuel ratios #nA/F (n=1, 2, 3, 4) of the respective cylinders of the engine 1 from the output KACT from the LAF sensor 4, and a plurality of PID controllers 21 (as many as the number of the cylinders) for determining respective feedback correction coefficients #nKLAF for fuel injection quantities for the cylinders from the respective real air-fuel ratios #nA/F estimated by the observer 20 according to a PID control process so as to eliminate variations of the air-fuel ratios of the cylinders.

Briefly stated, the observer 20 estimates a real air-fuel ratio #nA/F of each of the cylinders as follows: A system from the engine 1 to the LAF sensor 4 (where the exhaust gases from the cylinders are combined) is considered to be a system for generating an air-fuel ratio detected by the LAF sensor 4 from a real air-fuel ratio #nA/F of each of the cylinders, and is modeled in view of a detection response delay of the LAF sensor 4 (e.g., a delay of first order) and a chronological contribution of the air-fuel ratio of each of the cylinders of the engine 1 to the air-fuel ratio detected by the LAF sensor 4. Based on the modeled system, a real air-fuel ratio #nA/F of each of the cylinders is estimated from the output KACT from the LAF sensor 4.

Details of the observer 20 are disclosed in Japanese laid-open patent publication No. 7-83094 or U.S. Pat. No. 5,531,208, for example, and will not be described below.

Each of the PID controllers 21 of the local feedback controller 15 divides the output KACT from the LAF sensor 4 by an average value of the feedback correction coefficients #nKLAF for all the cylinders determined by the respective PID controllers 21 in a preceding control cycle to produce a quotient value, and uses the quotient value as a target air-fuel ratio for the corresponding cylinder. Each of the PID controllers 21 then determines a feedback correction coefficient #nKLAF in a present control cycle so as to eliminate any difference between the target air-fuel ratio and the estimated value of the corresponding real air-fuel ratio #nA/F determined by the observer 20.

The local feedback controller 15 multiplies a value, which has been produced by multiplying the demand fuel injection quantity Tcyl by the feedback correction coefficient KFB produced by the general feedback controller 14, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the engine 1 by a fuel accumulation corrector 22 in the fuel supply controller 7. The corrected output fuel injection quantity #nTout is applied, as a command for the fuel injection quantity for each of the cylinders, to each of fuel injectors (not shown)

of the engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273 and U.S. Pat. No. 5,568,799, for example, and will not be described in detail below.

The general feedback controller 14, particularly, the adaptive controller 17, will further be described below.

The general feedback controller 14 effects a feedback control process to converge the output KACT (detected air-fuel ratio of the engine 1) from the LAF sensor 4 toward the target air-fuel ratio KCMD as described above. If such a feedback control process were carried out under the known PID control only, it would be difficult keep stable controllability against dynamic behavioral changes including changes in the operating conditions of the engine 1, characteristic changes due to aging of the engine 1, etc.

Figure 9:
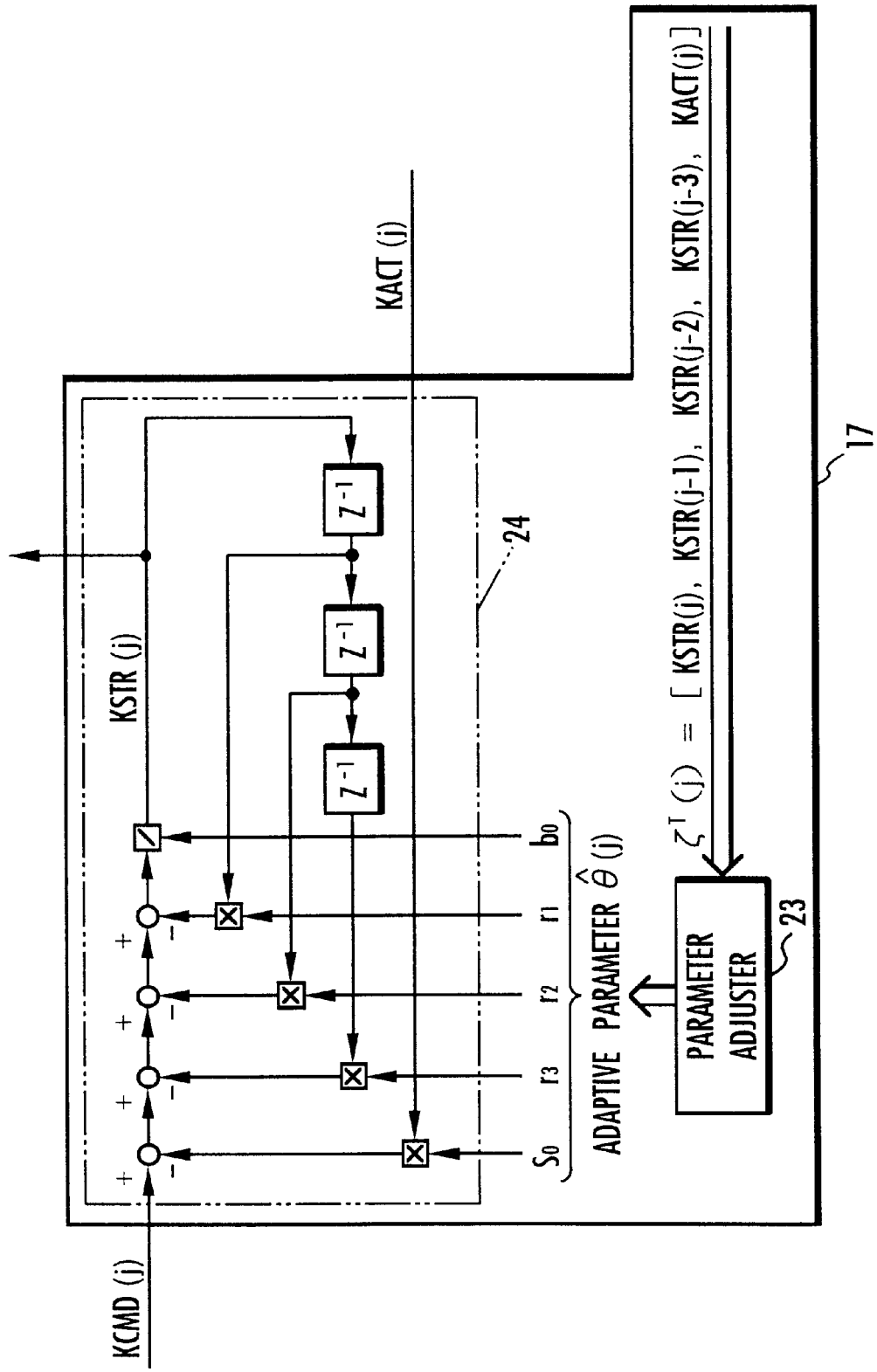
FIG. 9 is a block diagram of a basic arrangement of an adaptive controller of the fuel supply controller shown in FIG. 8.

The adaptive controller 17 is a recursive-type controller which makes it possible to carry out a feedback control process while compensating for dynamic behavioral changes of the engine 1. As shown in FIG. 9, the adaptive controller 17 comprises a parameter adjuster 23 for establishing a plurality of adaptive parameters using the parameter adjusting law proposed by I. D. Landau, et al., and a manipulated variable calculator 24 for calculating the feedback manipulated variable KSTR using the established adaptive parameters.

The parameter adjuster 23 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (14), (15), given below, an adaptive parameter θ hat (j) (j indicates the ordinal number of a control cycle) established by the parameter adjuster 23 is represented by a vector (transposed vector) according to the equation (16) given below. An input ζ(j) to the parameter adjuster 23 is expressed by the equation (17) given below. In the present embodiment, it is assumed that the engine 1, which is an object to be controlled by the general feedback controller 14, is considered to be a plant of a first-order system having a dead time dp corresponding to the time of three combustion cycles of the engine 1, and m=n=1, dp=3 in the equations (14)–(17), and five adaptive parameters s0, r1, r2, r3, b0 are established (see FIG. 9). In the upper and middle expressions of the equation (17), us, ys generally represent an input (manipulated variable) to the object to be controlled and an output (controlled variable) from the object to be controlled. In the present embodiment, the input is the feedback manipulated variable KSTR and the output from the object (the engine 1 ) is the output KACT (detected air-fuel ratio) from the LAF sensor 4, and the input ζ(j) to the parameter adjuster 23 is expressed by the lower expression of the equation (17) (see FIG. 9).

$$A(Z^{-1})=1+a1Z^{-1}+\ldots+anZ^{-n} \qquad (14)$$

$$B(Z^{-1})=b0+b1Z^{-1}+\ldots+bmZ^{-m} \qquad (15)$$

$$\hat{\theta}^T(j)=[\hat{b}0(j),\hat{B}R(Z^{-1},j),\hat{S}(Z^{-1},j)]$$
$$=[b0(j),r1(j),\ldots,rm+dp-1(j),s0(j),\ldots,sn-1(j)]=[b0(j),r1(j),r2(j),r3(j),s0(j)] \qquad (16)$$

$$\zeta^T(j)=[us(j),\ldots,us(j-m-dp+1),ys(j),\ldots,ys(j-n+1)]$$
$$=[us(j),us(j-1),us(j-2),us(j-3),ys(j)]=[KSTR(j),KSTR(j-1),KSTR(j-2),KSTR(j-3),KACT(j)] \qquad (17)$$

The adaptive parameter θ hat expressed by the equation (16) is made up of a scalar quantity element b0 hat$^{-1}$ (j) for determining the gain of the adaptive controller 17, a control element BR hat $(Z^{-1}, j)$ expressed using a manipulated variable, and a control element S $(Z^{-1}, j)$ expressed pressed using a controlled variable, which are expressed respectively by the following equations (18)–(20) (see the block of the manipulated variable calculator 24 shown in FIG. 9):

$$\hat{b}0^{-1}(j)=\frac{1}{b0} \qquad (18)$$

$$\hat{B}R(Z^{-1},j)=r1Z^{-1}+r2Z^{-2}+\cdots+rm+dp-1Z^{-(m+dp-1)} \qquad (19)$$
$$=r1Z^{-1}+r2Z^{-2}+r3Z^{-3}$$

$$\hat{S}(Z^{-1},j)=s0+s1Z^{-1}+\cdots+sn-1Z^{-(n-1)} \qquad (20)$$
$$=s0$$

The parameter adjuster 23 establishes coefficients of the scalar quantity element and the control elements, described above, and supplies them as the adaptive parameter θ hat expressed by the equation (16) to the manipulated variable calculator 24. The parameter adjuster 23 calculates the adaptive parameter θ hat so that the output KACT from the LAF sensor 4 will agree with the target air-fuel ratio KCMD, using time-series data of the feedback manipulated variable KSTR from the present to the past and the output KACT from the LAF sensor 4.

Specifically, the parameter adjuster 23 calculates the adaptive parameter θ hat according to the following equation (21):

$$\hat{\theta}(j)=\hat{\theta}(j-1)+\Gamma(j-1)\cdot\zeta(j-dp)\cdot e^*(j) \qquad (21)$$

where Γ(j) represents a gain matrix (whose degree is indicated by m+n+dp) for determining a rate of establishing the adaptive parameter θ hat, and e*(j) an estimated error of the adaptive parameter θ hat. Γ(j) and e*(j) are expressed respectively by the following recursive formulas (22), (23):

$$\Gamma(j)=\frac{1}{\lambda 1(j)}\cdot\left[\Gamma(j-1)-\frac{\lambda 2(j)\cdot\Gamma(j-1)\cdot\zeta(j-dp)\cdot\zeta(j-dp^T)\cdot\Gamma(j-1)}{\lambda 1(j)+\lambda 2(j)\cdot\zeta(j-dp^T)\cdot\Gamma(j-1)\cdot\zeta(j-dp)}\right] \qquad (22)$$

where 0<λ1(j)≦1, 0>0.

$$e^*(j)=\frac{D(Z^{-1})\cdot KACT(j)-\hat{\theta}^T(j-1)\cdot\zeta(j-dp)}{1+\zeta^T(j-dp)\cdot\Gamma(j-1)\cdot\zeta(j-dp)} \qquad (23)$$

where $D(Z^{-1})$ represents an asymptotically stable polynomial for adjusting the convergence. In the present embodiment, $D(Z^{-1})=1$.

Various specific algorithms including the degressive gain algorithm, the variable gain algorithm, the fixed trace algorithm, and the fixed gain algorithm are obtained depending on how λ1(j), λ2(j) in the equation (22) are selected. For a time-dependent plant such as a fuel injection process, an air-fuel ratio, or the like of the engine 1, either one of the degressive gain algorithm, the variable gain algorithm, the fixed gain algorithm, and the fixed trace algorithm is suitable.

Using the adaptive parameter θ hat (s0, r1, r2, r3, b0) established by the parameter adjuster 23 and the target air-fuel ratio KCMD, the manipulated variable calculator 24 determines the feedback manipulated variable KSTR according to a recursive formula expressed by the following equation (24):

$$KSTR = \frac{1}{b0} \cdot [KCMD(j) - s0 \cdot KACT(j) - r1 \cdot KSTR(j-1) - \\ r2 \cdot KSTR(j-2) - r3 \cdot KSTR(j-3)] \quad (24)$$

The manipulated variable calculator 24 shown in FIG. 9 represents a block diagram of the calculations according to the equation (24).

The feedback manipulated variable KSTR determined according to the equation (24) becomes the target air-fuel ratio KCMD insofar as the output KACT of the LAF sensor 4 agrees with the target air-fuel ratio KCMD. Therefore, the feedback manipulated variable KSTR is divided by the target air-fuel ratio KCMD by the divider 18 for thereby determining the feedback manipulated variable kstr that can be used as the feedback correction coefficient KFB.

As is apparent from the foregoing description, the adaptive controller 17 thus constructed is a recursive-type controller taking into account dynamic behavioral changes of the engine 1 which is an object to be controlled. Stated otherwise, the adaptive controller 17 is a controller described in a recursive form to compensate for dynamic behavioral changes of the engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 17 constructed as described above is suitable for compensating for dynamic behavioral changes of the engine 1.

The details of the adaptive controller 17 have been described above.

The PID controller 16, which is provided together with the adaptive controller 17 in the general feedback controller 14, calculates a proportional term (P term), an integral term (I term), and a derivative term (D term) from the difference between the output KACT of the LAF sensor 4 and the target air-fuel ratio KCMD, and calculates the total of those terms as the feedback manipulated variable KLAF, as is the case with the general PID control process. In the present embodiment, the feedback manipulated variable KLAF is set to "1" when the output KACT of the LAF sensor 4 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed and intake pressure of the engine 1 using a predetermined map.

The switcher 19 of the general feedback controller 14 outputs the feedback manipulated variable KLAF determined by the PID controller 16 as the feedback correction coefficient KFB for correcting the fuel injection quantity if the combustion in the engine 1 tends to be unstable as when the temperature of the coolant of the engine 1 is low, the engine 1 rotates at high speeds, or the intake pressure is low, or if the output KACT of the LAF sensor 4 is not reliable due to a response delay of the LAF sensor 4 as when the target air-fuel ratio KCMD changes largely or immediately after the air-fuel ratio feedback control process has started, or if the engine 1 operates highly stably as when it is idling and hence no high-gain control process by the adaptive controller 17 is required. Otherwise, the switcher 19 outputs the feedback manipulated variable kstr which is produced by dividing the feedback manipulated variable KSTR determined by the adaptive controller 17 by the target air-fuel ration KCMD, as the feedback correction coefficient KFB for correcting the fuel injection quantity. This is because the adaptive controller 17 effects a high-gain control process and functions to converge the output KACT of the LAF sensor 4 quickly toward the target air-fuel ratio KCMD, and if the feedback manipulated variable KSTR determined by the adaptive controller 17 is used when the combustion in the engine 1 is unstable or the output KACT of the LAF sensor 4 is not reliable, then the air-fuel ratio control process tends to be unstable.

Such operation of the switcher 19 is disclosed in detail in Japanese laid-open patent publication No. 8-105345 or U.S. Pat. No. 5,558,075, and will not be described in detail below.

Operation of the entire system according to the present embodiment will be described below.

First, a control process carried out by the fuel supply controller 7 for controlling the fuel injection quantity for the engine 1 will be described below with reference to FIGS. 10 and 11.

The fuel supply controller 7 performs the control process in control cycles in synchronism with a crankshaft angle period (TDC) of the engine 1 as follows:

The fuel supply controller 7 reads outputs from various sensors including sensors for detecting the rotational speed NE and intake pressure PB of the engine 1, the LAF sensor 4, and the exhaust gas sensor 5 in STEPa.

Then, the basic fuel injection quantity calculator 10 corrects a fuel injection quantity corresponding to the rotational speed NE and intake pressure PB of the engine 1 depending on the effective opening area of the throttle valve, thereby calculating a basic fuel injection quantity Tim in STEPb. The first correction coefficient calculator 11 calculates a first correction coefficient KTOTAL depending on the coolant temperature and the amount by which the canister is purged in STEPc.

The fuel supply controller 7 decides whether the target air-fuel ratio KCMD generated by the target air-fuel ratio calculating means 6b is to be used or not, i.e., determines ON/OFF of an air-fuel ratio manipulating process, in order to manipulate the air-fuel ratio of the engine 1, and sets a value of a flag f/btc/on which represents ON/OFF of the air-fuel ratio manipulating process in STEPd. When the value of the flag f/btc/on is "0", it means that the target air-fuel ratio KCMD generated by the main processing controller 6 is not to be used (OFF), and when the value of the flag f/btc/on is "1", it means that the target air-fuel ratio KCMD generated by the main processing controller 6 is to be used (ON).

Figure 11:
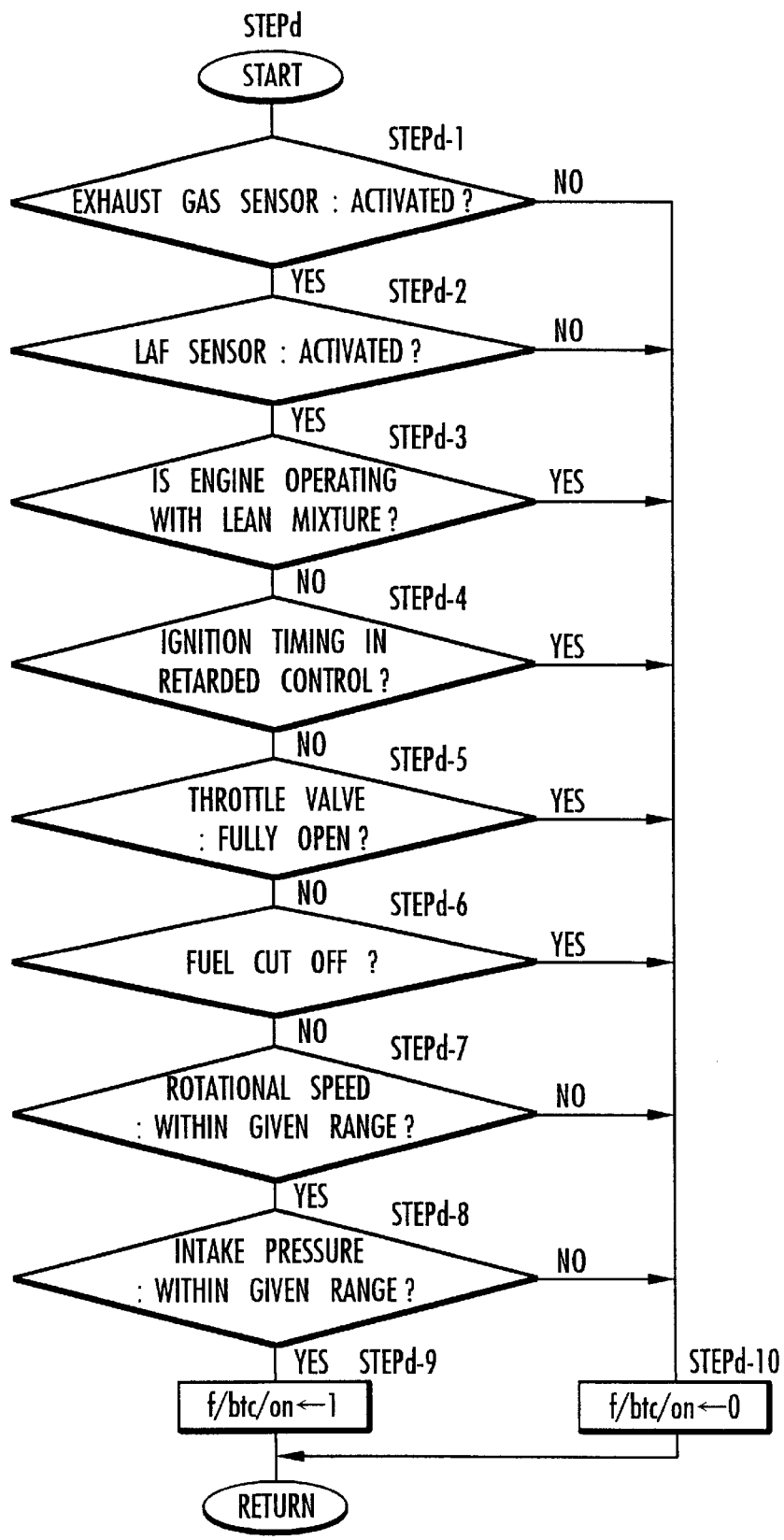
FIG. 11 is a flowchart of a subroutine of the operation sequence shown in FIG. 10.

The deciding subroutine of STEPd is shown in detail in FIG. 11. As shown in FIG. 11, the fuel supply controller 7 decides whether the exhaust gas sensor (NOx sensor) 5 is activated or not in STEPd-1 and the LAF sensor 4 is activated or not in STEPd-2. The fuel supply controller 7 decides whether these sensors are activated or not based on the output voltages thereof.

If neither one of the exhaust gas sensor 5 and the LAF sensor 4 is activated, since detected data from the sensors 5, 4 for use by the fuel supply controller 7 is not accurate enough, the value of the flag f/btc/on is set to "0" in STEPd-10.

Then, the fuel supply controller 7 decides whether the engine 1 is operating with a lean air-fuel mixture or not in STEPd-3. The fuel supply controller 7 decides whether the ignition timing of the engine 1 is retarded for early activation of the catalytic converter 3 immediately after the start of the engine 1 or not in STEPd-4. The fuel supply controller 7 decides whether the throttle valve of the engine 1 is fully open or not in STEPd-5. The fuel supply controller 7 decides whether the supply of fuel to the engine 1 is being stopped or not in STEPd-6. If either one of the conditions of these steps is satisfied, then since it is not preferable or possible to manipulate the air-fuel ratio of the engine 1 using the target air-fuel ratio KCMD generated by the main processing controller 6, the value of the flag f/btc/on is set to "0" in STEPd-10.

The fuel supply controller 7 then decides whether the rotational speed NE and the intake pressure PB of the engine 1 fall within respective given ranges or not respectively in STEPd-7, STEPd-8. If either one of the rotational speed NE and the intake pressure PB does not fall within its given range, then since it is not preferable or possible to manipulate the air-fuel ratio of the engine 1 using the target air-fuel ratio KCMD generated by the main processing controller 6,the value of the flag f/btc/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied (the engine 1 is in normal operation in these cases), then the value of the flag f/btc/on is set to "1" to use the target air-fuel ratio KCMD generated by the main processing controller 6 for manipulating the air-fuel ratio of the engine 1 in STEPd-9.

Figure 10:
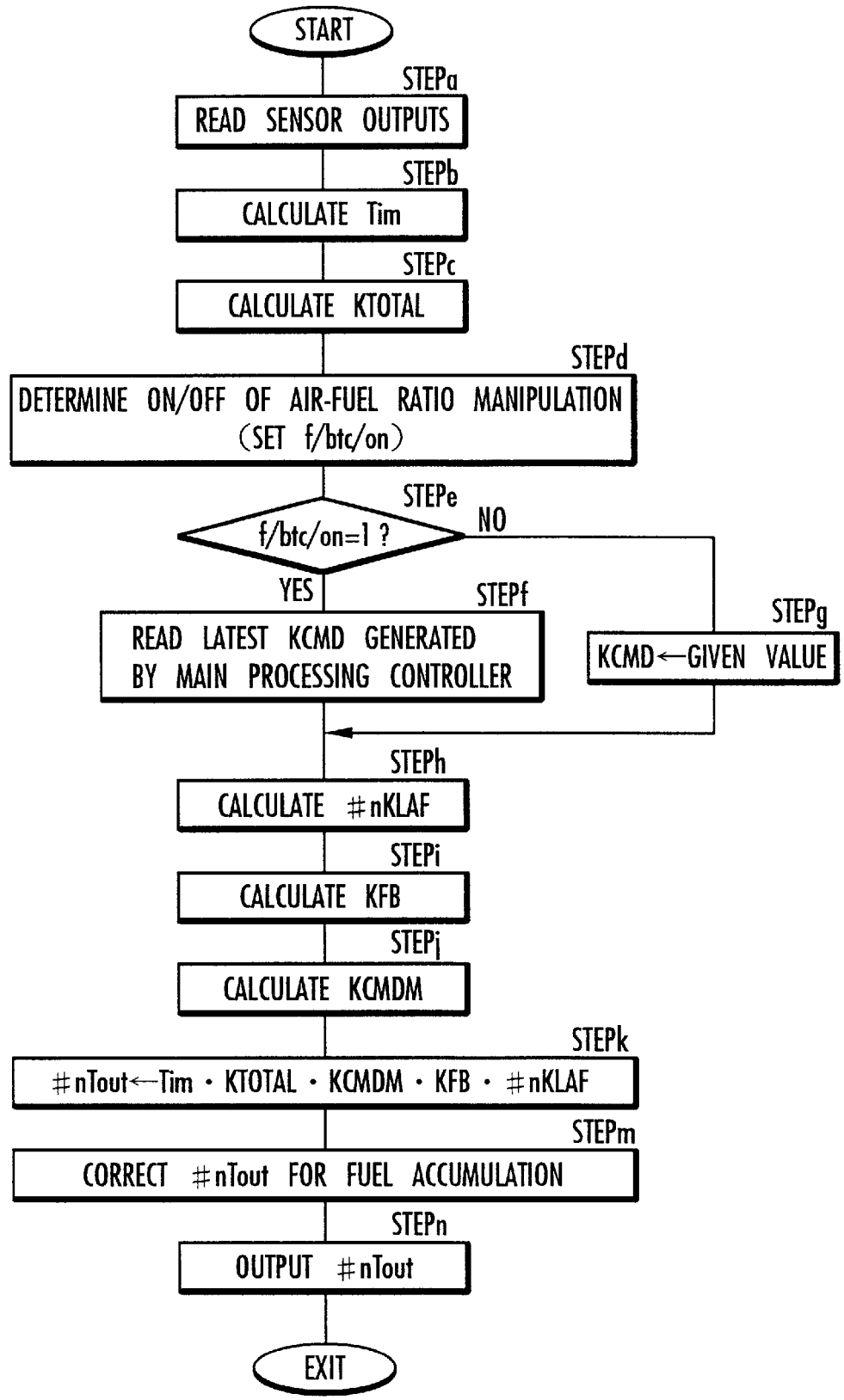
FIG. 10 is a flowchart of a processing sequence of the fuel supply controller of the system shown in FIG. 1.

In FIG. 10, after the value of the flag f/btc/on has been set as described above, the fuel supply controller 7 determines the value of the flag f/btc/on in STEPe. If f/btc/on=1, then the fuel supply controller 7 reads the latest target air-fuel ratio KCMD generated by the main processing controller 6 in STEPf. If f/btc/on=0, then the fuel supply controller 7 sets the target air-fuel ratio KCMD to a given value determined from the rotational speed NE and intake pressure PB of the engine 1 using a predetermined map in STEPg.

In the local feedback controller 15, the PID controllers 15 calculate respective feedback correction coefficients #nKLAF in order to eliminate variations in the air-fuel ratio among the cylinders, based on actual air-fuel ratios #nA/F of the respective cylinders which have been estimated from the output KACT of the LAF sensor 4 by observer 20, in STEPh. Then, the general feedback controller 14 calculates a feedback correction coefficient KFB in STEPi.

Depending on the operating conditions of the engine 1, the switcher 19 selects either the feedback manipulated variable KLAF or the feedback manipulated variable kstr which has been produced by dividing the feedback manipulated variable KSTR determined by the adaptive controller 17 by the target air-fuel ratio KCMD (normally, the switcher 19 selects the feedback manipulated variable kstr). The switcher 19 then outputs the selected feedback manipulated variable KLAF or kstr as a feedback correction coefficient KFB for correcting the fuel injection quantity.

When switching the feedback correction coefficient KFB from the feedback manipulated variable KLAF from the PID controller 16 to the feedback manipulated variable kstr from the adaptive controller 17, the adaptive controller 17 determines a feedback manipulated variable KSTR in a manner to hold the correction coefficient KFB to the preceding correction coefficient KFB (=KLAF) as long as in the cycle time for the switching in order to avoid an abrupt change in the correction coefficient KFB. When switching the feedback correction coefficient KFB from the feedback manipulated variable kstr from the adaptive controller 17 to the feedback manipulated variable KLAF from the PID controller 16, the PID controller 16 calculates a present correction coefficient KLAF in a manner to regard the feedback manipulated variable KLAF determined by itself in the preceding cycle time as the preceding correction coefficient KFB (=kstr).

After having thus calculated the feedback correction coefficient KFB, the second correction coefficient calculator 12 calculates in STEPj a second correction coefficient KCMDM depending on the target air-fuel ratio KCMD determined in STEPf or STEPg.

Then, the fuel supply controller 7 multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the engine 1 by the fuel accumulation correctors 22 in STEPm. The corrected output fuel injection quantities #nTout are applied to the non-illustrated fuel injectors of the engine 1 in STEPn.

In the engine 1, the fuel injectors inject fuel into the respective cylinders according to the respective output fuel injection quantities #nTout.

The above calculation of the output fuel injection quantities #nTout for the respective cylinders and control of the fuel injection of the engine 1 is carried out in successive cycles synchronous with the crankshaft angle period (TDC) of the engine 1 for controlling the air-fuel ratio of the engine 1 in order to converge the output KACT of the LAF sensor 4 toward the target air-fuel ratio KCMD. While the feedback manipulated variable kstr from the adaptive controller 17 is being used as the feedback correction coefficient KFB, the output KACT of the LAF sensor 4 is quickly converged toward the target air-fuel ratio KCMD with high stability against behavioral changes such as changes in the operating conditions of the engine 1 and characteristic changes thereof. A response delay of the engine 1 is also appropriately compensated for.

Figure 12:
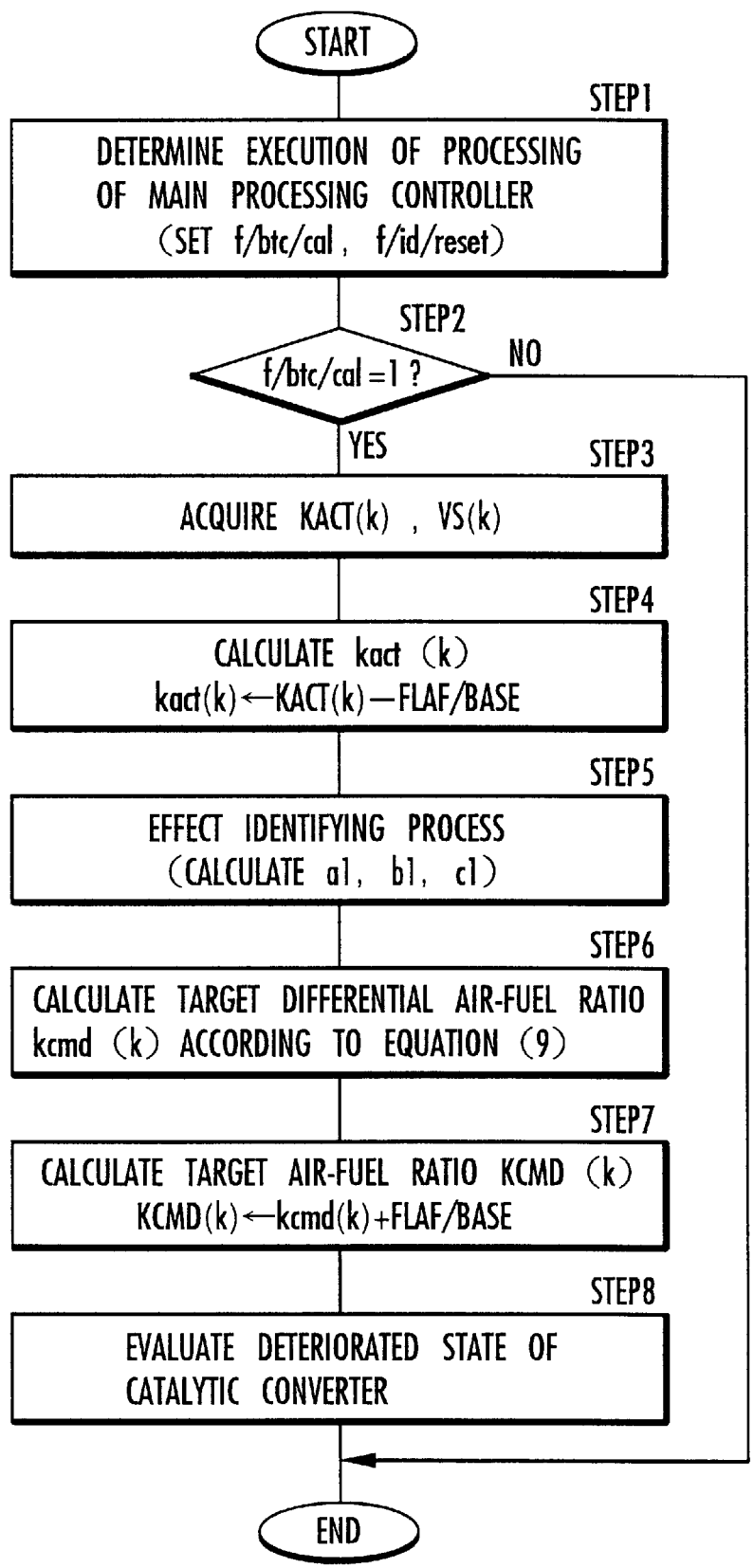
FIG. 12 is a flowchart of a processing sequence of the main processing controller of the system shown in FIG. 1.

Concurrent with the above air-fuel ratio manipulation for the engine 1, i.e., the above control of the fuel injection quantity, the main processing controller 6 executes a main routine shown in FIG. 12 in control cycles of a constant period.

As shown in FIG. 12, the main processing controller 6 decides whether its own processing (the process of identifying the parameters a1, b1, c1, the process of calculating the target air-fuel ratio KCMD, and the process of evaluating the deteriorated state of the catalytic converter 3) is to be executed or not, and sets a value of a flag f/btc/cal indicative of whether the processing is to be executed or not in STEP1. When the value of the flag f/btc/cal is "1", it means that the processing of the main processing controller 6 is to be executed, and when the value of the flag f/btc/cal is "0", it means that the processing of the main processing controller 6 is not to be executed. In STEP1, the main processing controller 6 also sets a value of a flag f/id/reset indicative of whether an initialization, described later on, with respect to the process of identifying the parameters a1, b1, c1, is to be effected or not.

Figure 13:
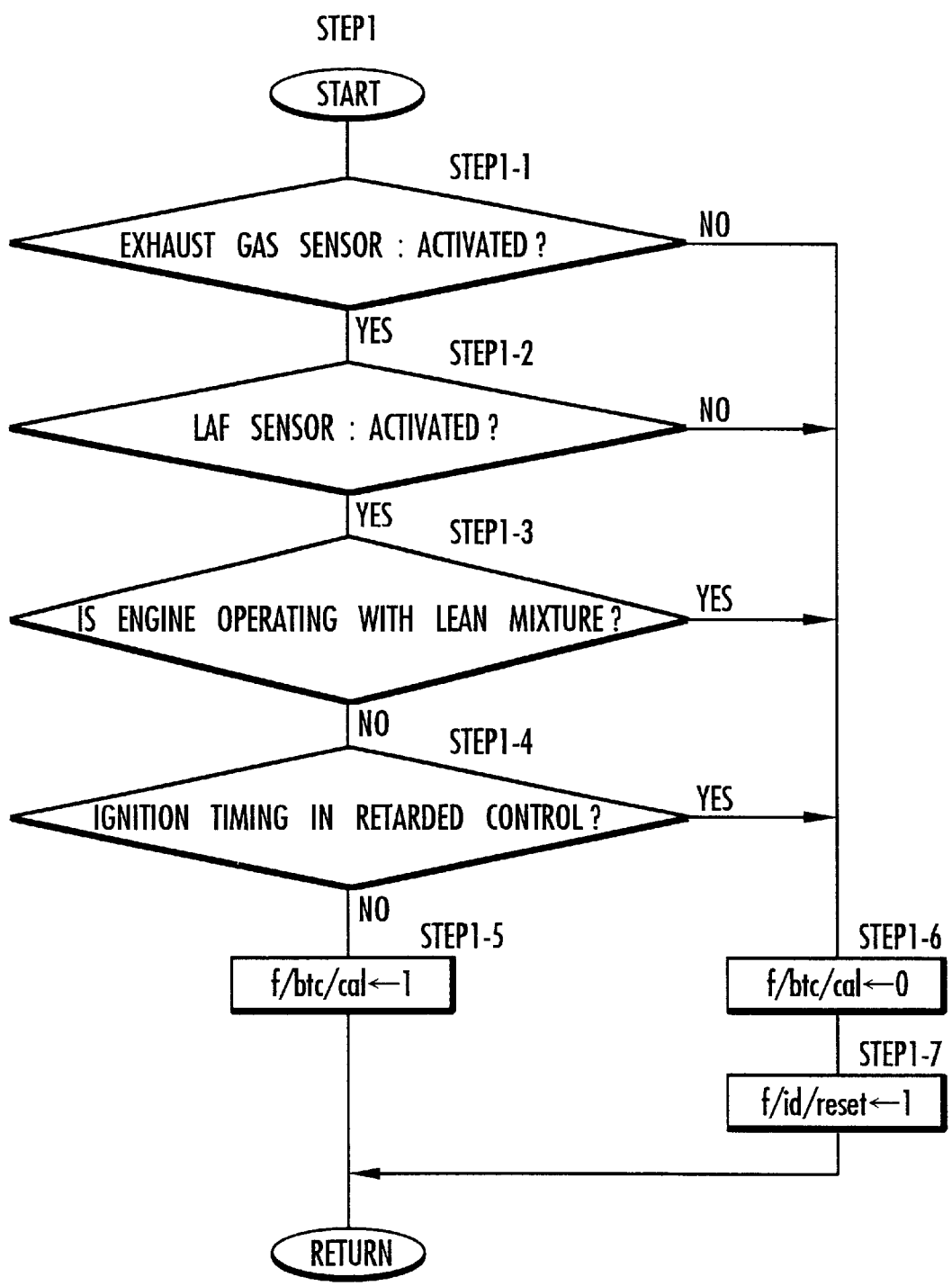
FIG. 13 is a flowchart of a subroutine of the operation sequence shown in FIG. 12.

The subroutine in STEP1 is shown in detail in FIG. 13. As shown in FIG. 13, the main processing controller 6 decides whether the exhaust gas sensor 5 is activated or not in STEP1-1 and whether the LAF sensor 4 is activated or not in STEP1-2. If neither one of the exhaust gas sensor 5 and the LAF sensor 4 is activated, since detected data from the exhaust gas sensor 5 and the LAF sensor 4 for use by the main processing controller 6 are not accurate enough, the value of the flag f/btc/cal is set to "0" in STEP1-6.

Then, in order to perform an initialization, described later on, with respect to the process of identifying the parameters a1, b1, c1, the main processing controller 6 sets the value of the flag f/id/reset to "1" in STEP1-7.

The main processing controller 6 decides whether the engine 1 is operating with a lean air-fuel mixture or not in STEP1-3. The main processing controller 6 decides whether the ignition timing of the engine 1 is retarded for early activation of the catalytic converter 3 immediately after the start of the engine 1 or not in STEP1-4. If the conditions of these steps are satisfied, then since the target air-fuel ratio KCMD calculated by the main processing controller 6 is not used for the fuel control for the engine 1, the processing in STEP1-6, STEP1-7 is executed to set the values of the flags f/btc/ca1, f/id/reset respectively to "0" and "1".

If the conditions of STEP1-1, STEP1-2 are satisfied and the conditions of STEP1-3, STEP1-4 are not satisfied, then the value of the flag f/btc/cal is set to "1" in STEP1-5.

By thus setting the flag f/btc/cal, even in a situation where the target air-fuel ratio KCMD calculated by the main processing controller 6 is not used by the fuel supply controller 7 (see FIG. 11), when the supply of fuel to the engine 1 is being cut off or when the throttle valve is being fully open, the flag f/btc/cal is set to "1". When the supply of fuel to the engine 1 is being cut off or when the throttle valve is being fully open, therefore, the main processing controller 6 performs the process of calculating the target air-fuel ratio KCMD and the process of evaluating the deteriorated state of the catalytic converter 3. This is because such an operating situation of the engine 1 is basically temporary.

In FIG. 12, after the above deciding subroutine, the main processing controller 6 determines the value of the flag f/btc/cal set in STEP1 in STEP2. If f/btc/cal=0, then the main processing controller 6 puts an end to the processing in the present control cycle immediately without calculating the target air-fuel ratio KCMD and evaluating the deteriorated state of the catalytic converter 3.

If f/btc/cal=1 in STEP2, then the main processing controller 6 acquires data of the present value KACT(k) of the output KACT of the LAF sensor 4 and data of the present value VS(k) of the output VS of the exhaust gas sensor 5 in STEP3.

Then, the main processing controller 6 determines a differential output kact(k) by subtracting the air-fuel ratio reference value FLAF/BASE from the output KACT(k) of the LAF sensor 4 which has been acquired in STEP3 in STEP4.

Then, the main processing controller 6 performs the process of identifying the parameters a1, b1, c1 according to its function as the identifying means 6a in STEP5.

Figure 14:
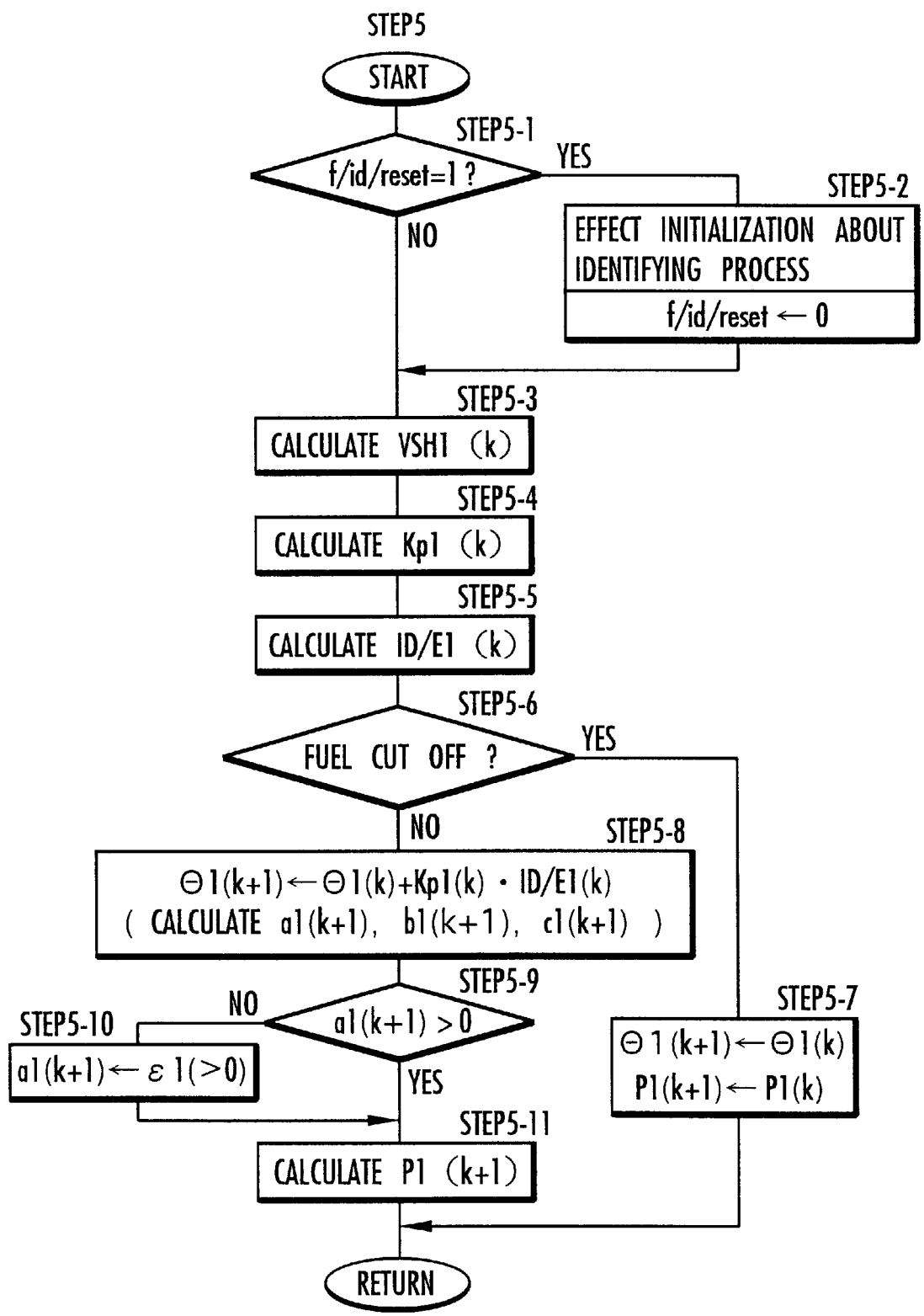
FIG. 14 is a flowchart of a subroutine of the operation sequence shown in FIG. 12.

The process of identifying the parameters a1, b1, c1 is carried out according to a subroutine shown in FIG. 14.

As shown in FIG. 14, the identifying means 6a determines the value of the flag f/id/reset in STEP5-1. If the value of the flag f/id/reset is "1", then the identifying means 6a performs an initialization with respect to the identifying process in STEP5-2. In this initialization, the identified values of the parameters a1, b1, c1 are set to predetermined initial values (the identified parameter vector Θ1 is initialized), and the elements of the matrix P1 (diagonal matrix) according to the equation (6) are set to predetermined initial values. The value of the flag f/id/reset is reset to "0".

Then, the identifying means 6a calculates the equation (2) to determine a function output VSH1(k) of the exhaust gas sensor 5, using the present values a1(k), b1(k), c1(k) (the identified values determined in the preceding control cycle) of the parameters a1, b1, c1 and the present value kact(k) of the differential output kact of the LAF sensor 4 determined in STEP4 in STEP5-3.

The identifying means 6a then calculates the vector KP1(k) to be used in determining the new identified values of the parameters a1, b1, c1 in STEP5-4. Thereafter, the identifying means 6a calculates the identified error ID/E1(k) in STEP5-5.

The identified error ID/E1(k) is calculated according to the equation (3) from the present value VS(k) of the exhaust gas sensor 5 acquired in STEP3 and the function output VSH1(k) determined in STEP5-3. The vector Kp1(k) is calculated according to the equation (5) from the vector $\xi 1(k)$ defined with respect to the equation (2) using the present differential output kact(k) of the LAF sensor 4 and the present value P1(k) of the matrix P1 (which is basically the matrix P finally determined in the preceding control cycle).

The identifying means 6a then decides whether the supply of fuel to the engine 1 is being stopped or not in STEP5-6. If the supply of fuel to the engine 1 is being stopped, then since the output KACT of the LAF sensor 4 and the output VS of the exhaust gas sensor 5 which are suitable to identify the values of the parameters a1, b1, c1 are not available, the identifying means 6a keeps the identified parameter vector Θ1 at the preset value, i.e., keeps the new identified values a1(k+1), b1(k+1), c1(k+1) of the parameters a1, b1, c1 at the present values a1(k), b1(k), c1(k), respectively, and keeps the matrix P1 at the present value in STEP5-7. Then, the processing in STEP5 is finished, and control returns to the routine shown in FIG. 12.

If the supply of fuel to the engine 1 is not being stopped in STEP5-6, then the identifying means 6a updates the identified parameter vector Θ1 according to the equation (4) using the vector Kp1(k) and the identified error ID/E1(k) determined in STEP5-4, STEP5-5, thus determining the new identified values a1(k+1), b1(k+1), c1(k+1) of the parameters a1, b1, c1 in STEP5-8.

Then, the identifying means 6a decides whether the new identified value a1(k+1) of the parameter a1 is positive or not in STEP5-9.

Because the air-fuel ratio-related characteristics of the output VS of the exhaust gas sensor 5 as expressed by the above quadratic function basically have a minimum value, the identified value a1(k+1) of the parameter a1 which is the coefficient of the term of second degree of the quadratic function must be a positive value. If the identified value a1(k+1) becomes negative due to disturbances or the like, then the quadratic function with the negative identified value a1(k+1) as the coefficient of the term of second degree thereof does not have a minimum value, but a maximum value. Using this quadratic function, it would not be possible to appropriately determine the target air-fuel ratio KCMD for maximizing the purification rate of the NOx by the catalytic converter 3.

Therefore, if a1(k+1)≦0 in STEP5-9, then the identifying means 6a forcibly sets the latest identified value a1(k+1) of the parameter a1 to a predetermined value ∈1 which is a sufficiently small positive value (e.g., 0.01) in STEP5-10. In this manner, the identified value of the parameter a1 is limited to a positive value such that the function output VSH1 which is a function value of the quadratic function and the NOx concentration corresponding to the function output VSH1 have a minimum value. If a1(k+1)>0 in STEP5-9, then the latest identified value a1(k+1) of the parameter a1 remains as it is.

After having limited the identified value of the parameter a1, the identifying means 6a updates the matrix P1 according to the equation (6) for the processing in the next control cycle in STEP5-11. Then, the processing in STEP5 is finished, and control returns to the routine shown in FIG. 12.

In FIG. 12, after having identified the values of the parameters a1, b1, c1 of the quadratic function, the main processing controller 6 calculates a target differential air-fuel ratio kcmd(k) in the present control cycle according to the equation (9) from the latest identified values a1(k+1), b1(k+1), c1(k+1) of the parameters a1, b1, c1 according to its function as the target air-fuel ratio calculating means 6b in STEP6.

Specifically, if the criterion formula $(b1^2 - 4 \cdot a1 \cdot c1)$ determined by the latest identified values a1(k+1), b1(k+1), c1(k+1) is equal to or smaller than "0", which is a normal case, then the target air-fuel ratio calculating means 6b calculates a target differential air-fuel ratio kcmd(k) according to the upper expression of the equation (9). If the criterion formula $(b1^2 - 4 \cdot a1 \cdot c1)$ is of a positive value greater than "0", which corresponds to the brandnew state of the catalytic converter 3, then the target air-fuel ratio calculating means 6b calculates a target differential air-fuel ratio kcmd(k) according to the lower expression of the equation (9).

Then, the target air-fuel ratio calculating means 6b adds the air-fuel ratio reference value FLAF/BASE to the target differential air-fuel ratio kcmd(k), thus determining a target air-fuel ratio KCMD(k) in the present control cycle in STEP7.

The target air-fuel ratio KCMD(k) thus determined in a memory (not shown) in a time-series fashion. When the fuel supply controller 7 is to manipulate the air-fuel ratio of the engine 1 using the target air-fuel ratio KCMD(k), the latest one of the time-series data of the target air-fuel ratio KCMD(k) is selected in each control cycle of the fuel supply controller 7.

If the identified value a1(k+1) of the parameter a1 of the quadratic function is set to the positive value ε1 in STEP5-10, then the target differential air-fuel ratio kcmd calculated using the value of the parameter a1 and the identified value b1(k+1) of the parameter b1 in STEP6 may possibly produce an error with respect to a target differential air-fuel ratio which is to be achieved, i.e., a target differential air-fuel ratio which minimizes the NOx concentration downstream of the catalytic converter 3. According to the sequential identifying algorithm of the identifying means 6a, in a control cycle after the identified value of the parameter a1 is limited to the positive value ε1, it is basically possible to quickly obtain a set of identified values of the parameters a1, b1, c1 with the identified value of the parameter a1 being positive. The situation where the identified value of the parameter a1 is negative tends to occur when the catalytic converter 3 is brand-new. When the catalytic converter 3 is brand-new, since the purification rate of the NOx by the catalytic converter 3 is high in a wide range of air-fuel ratios of the engine 1, any error of the target differential air-fuel ratio kcmd which is produced when the identified value of the parameter a1 is forcibly limited does not pose practical problems.

After having determined the target air-fuel ratio KCMD, the main processing controller 6 performs the process of evaluating the present deteriorated state of the catalytic converter 3 according to its function as the deteriorated state evaluating means 6c in STEP8.

Figure 15:
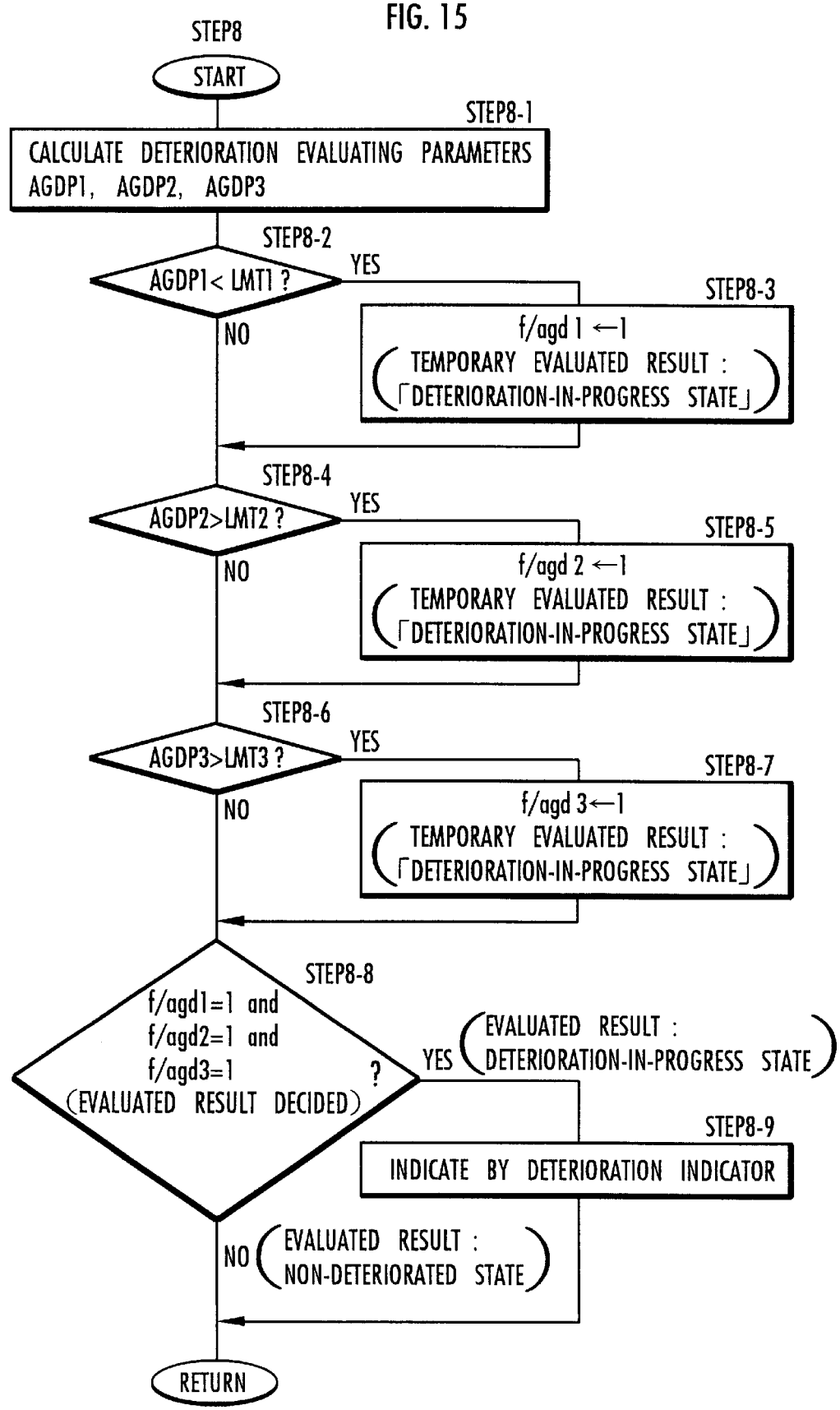
FIG. 15 is a flowchart of a subroutine of the operation sequence shown in FIG. 12.
Figure 16:
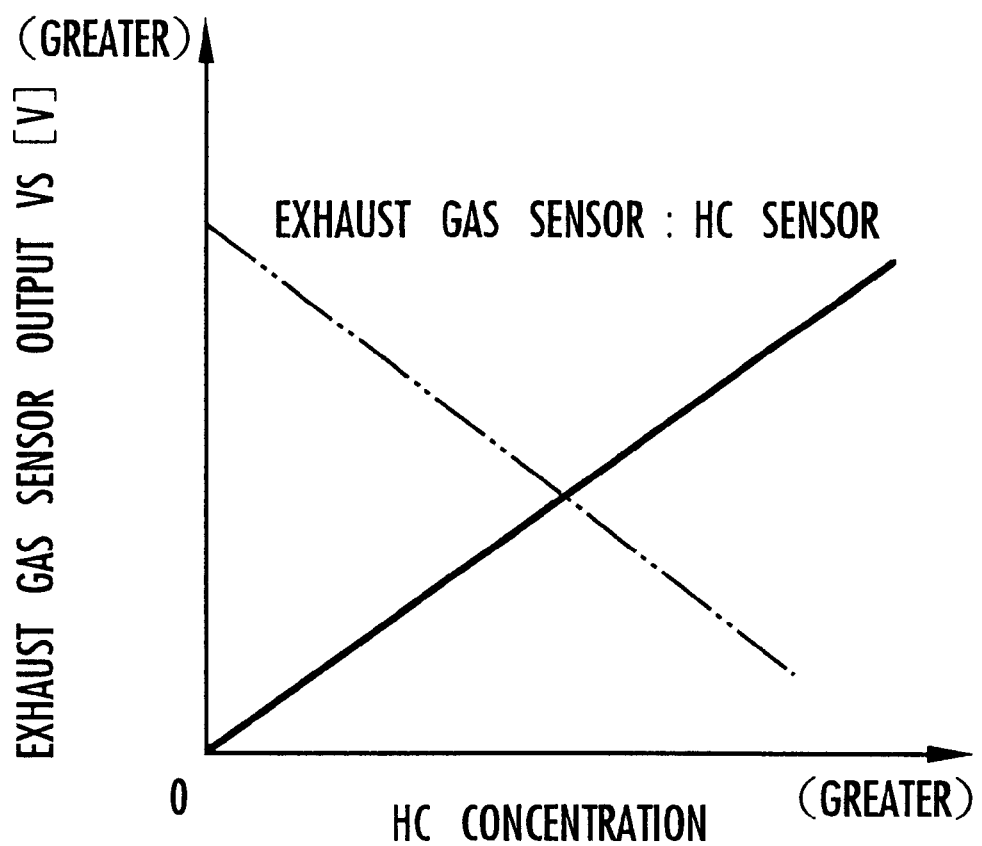
FIG. 16 is a diagram showing the output of an exhaust gas sensor (HC sensor) used by a system according to a second embodiment of the present invention.

The process of evaluating the present deteriorated state of the catalytic converter 3 is carried out according to a subroutine shown in FIG. 15.

As shown in FIG. 15, the deteriorated state evaluating means 6c calculates the first, second, and third deterioration evaluating parameters AGDP1, AGDP2, AGDP3 respectively from the latest identified values a1(k+1), b1(k+1), c1(k+1) of the parameters of the quadratic function determined in STEP5 according to the respective equations (11), (12), (13) in STEP8-1.

Then, the deteriorated state evaluating means 6c compares the value of the first deterioration evaluating parameter AGDP1 with the predetermined threshold LMT1 which corresponds to the first deterioration evaluating parameter AGDP1 in STEP8-2. As described above, the value of the first deterioration evaluating parameter AGDP1 decreases as the deterioration of the catalytic converter 3 progresses (see FIG. 7). Therefore, if AGDP1<LMT1, then the deteriorated state evaluating means 6c evaluates the deteriorated state of the catalytic converter 3 based on the first deterioration evaluating parameter AGDP1 as the deterioration-in-progress state, and sets the value of a flag f/agd1 to "1" in STEP8-3. The flag f/agd1 is of a value "1" when the deteriorated state of the catalytic converter 3 evaluated based on the first deterioration evaluating parameter AGDP1 is the deterioration-in-progress state, and a value "0" when the deteriorated state of the catalytic converter 3 evaluated based on the first deterioration evaluating parameter AGDP1 is the non-deteriorated state. Initially, the value of the flag f/agd1 is "0". If AGDP1≧LMT1 in STEP8-2, then the flag f/agd1 is kept at its present value.

Then, the deteriorated state evaluating means 6c compares the value of the second deterioration evaluating parameter AGDP2 with the predetermined threshold LMT2 which corresponds to the second deterioration evaluating parameter AGDP2 in STEP8-4. As described above, the value of the second deterioration evaluating parameter AGDP2 increases as the deterioration of the catalytic converter 3 progresses (see FIG. 7). Therefore, if AGDP2>LMT2, then the deteriorated state evaluating means 6c evaluates the deteriorated state of the catalytic converter 3 based on the second deterioration evaluating parameter AGDP2 as the deterioration-in-progress state, and sets the value of a flag f/agd2 to "1" in STEP8-5. The flag f/agd2 is of a value "1" when the deteriorated state of the catalytic converter 3 evaluated based on the second deterioration evaluating parameter AGDP2 is the deterioration-in-progress state, and a value "0" when the deteriorated state of the catalytic converter 3 evaluated based on the second deterioration evaluating parameter AGDP2 is the non-deteriorated state. Initially, the value of the flag f/agd2 is "0". If AGDP2≦LMT2 in STEP8-4, then the flag f/agd2 is kept at its present value.

Then, the deteriorated state evaluating means 6c compares the value of the third deterioration evaluating parameter AGDP3 with the predetermined threshold LMT3 which corresponds to the third deterioration evaluating parameter AGDP3 in STEP8-6. As described above, the value of the third deterioration evaluating parameter AGDP3 increases as the deterioration of the catalytic converter 3 progresses (see FIG. 7). Therefore, if AGDP3>LMT3, then the deteriorated state evaluating means 6c evaluates the deteriorated state of the catalytic converter 3 based on the third deterioration evaluating parameter AGDP3 as the deterioration-in-progress state, and sets the value of a flag f/agd3 to "1" in STEP8-7. The flag f/agd3 is of a value "1" when the deteriorated state of the catalytic converter 3 evaluated based on the third deterioration evaluating parameter AGDP3 is the deterioration-in-progress state, and a value "0" when the deteriorated state of the catalytic converter 3 evaluated based on the third deterioration evaluating parameter AGDP3 is the non-deteriorated state. Initially, the value of the flag f/agd3 is "0". If AGDP3≦LMT3 in STEP8-6, then the flag f/agd3 is kept at its present value.

After having evaluated the deteriorated state of the catalytic converter 3 based on the first, second, and third deterioration evaluating parameters AGDP1, AGDP2, AGDP3, the deteriorated state evaluating means 6c decides whether all the flags f/agd1, f/agd2, f/agd3 are "1" or not in STEP8-8. If f/agd1=1 and f/agd2=1 and f/agd3=1, i.e., if the deteriorated state of the catalytic converter 3 evaluated (temporarily evaluated) based on the first, second, and third deterioration evaluating parameters AGDP1, AGDP2, AGDP3 is the deterioration-in-progress state, the deteriorated state evaluating means 6c determines that the present deteriorated state of the catalytic converter 3 is the deterioration-in-progress state, and causes the deterioration indicator 8 to indicate the evaluation in STEP8-9. Specifically, the deterioration indicator 8 indicates that the catalytic converter 3 needs to be replaced immediately or soon. Control then returns to the routine shown in FIG. 12, and the processing in the present control cycle is ended.

If either one of the flags f/agd1, f/agd2, f/agd3 is "0" in STEP8-8, then the main processing controller 6 determines that the present deteriorated state of the catalytic converter 3 is the non-deteriorated state, and does not cause the deterioration indicator 8 to make any indication. Then, the processing in the present control cycle is ended.

The operation of the entire system according to the present embodiment has been described in detail above.

In this embodiment, the parameters a1, b1, c1 of the quadratic function that approximates the air-fuel ratio-related characteristics of the output VS of the exhaust gas sensor 5 (NOx sensor), which are also the air-fuel ratio-related characteristics of the NOx concentration detected by the exhaust gas sensor 5, are sequentially identified in each control cycle of the main processing controller 6 according to the sequential identifying algorithm, i.e., the algorithm of a sequential method of least squares in this embodiment, using the actual output VS of the exhaust gas sensor 5 and the actual output KACT of the LAF sensor 4 (the detected value of the actual air-fuel ratio of the engine 1).

Therefore, the values of the parameters a1, b1, c1 of the quadratic function are identified in a real-time fashion depending on the operating state of the engine 1 and the behavioral state of the catalytic converter 3 from instant to instant. As a result, the quadratic function determined by the identified values of the parameters a1, b1, c1 is capable of well approximating the above air-fuel ratio-related characteristics.

In view of the fact that the air-fuel ratio-related characteristics of the actual output VS of the exhaust gas sensor 5 (NOx sensor) basically have a minimum value, the identified value of the parameter a1 which is the coefficient of the term of second degree of the quadratic function is limited to a positive value such that the quadratic function has a minimum value. In this manner, the reliability of the quadratic function that is determined by the identified values of the parameters a1, b1, c1 as approximating the air-fuel ratio-related characteristics is increased.

In the present embodiment, the output KACT of the LAF sensor 4 is not directly used, but the differential output kact which represents the difference between the output KACT and the air-fuel ratio reference value FLAF/BASE is used, in order to identify the values of the parameters a1, b1, c1. Therefore, the accuracy of the identified values of the parameters a1, b1, c1 is increased.

In this embodiment, the first through third deterioration evaluating parameters AGDP1, AGDP2, AGDP3, which are determined from the identified values of the parameters a1, b1, c1 and whose values increase or degrease as the deterioration of the catalytic converter 3 progresses, are compared with the respective thresholds LMT1, LMT2, LMT3 to make temporary evaluations of the deteriorated state of the catalytic converter 3 based on the deterioration evaluating parameters AGDP1, AGDP2, AGDP3, i.e., to temporarily determine whether the catalytic converter 3 is in the deterioration-in-progress state or the non-deteriorated state. These temporary evaluations are combined to finalize the evaluation of the deteriorated state of the catalytic converter 3.

In this manner, the deteriorated state of the catalytic converter 3 can be evaluated appropriately with high reliability according to the relatively simple algorithm of the deteriorated state evaluating means 6c. If the evaluation represents the deterioration-in-progress state, then the deterioration indicator 8 makes an indication to cause the user to properly recognize that the catalytic converter 3 needs to be replaced immediately or soon.

Furthermore, the processing of the target air-fuel ratio calculating means 6b basically sets the value of the air-fuel ratio which minimizes the function output VSH1 of the exhaust gas sensor 5 that is the function value of the quadratic function, i.e., the value of the air-fuel ratio which minimizes the NOx concentration recognized from the function output VS, as the target air-fuel ratio KCMD.

Therefore, the target air-fuel ratio KCMD is substantially in agreement with the value of the air-fuel ratio of the engine 1 which minimizes the actual output VS of the exhaust gas sensor 5 or the actual NOx concentration represented thereby, i.e., the NOx concentration in the exhaust gas purified by the catalytic converter 3.

In this embodiment, the fuel injection quantity (fuel supply quantity) for the engine 1 is adjusted according to the feedback control process in order to converge the output KACT of the LAF sensor 4, i.e., then detected value of the actual air-fuel ratio of the engine 1, to the target air-fuel ratio KCMD. The feedback control process is carried out mainly by the adaptive controller 17. Thus, the air-fuel ratio of the engine 1 can be controlled at the target air-fuel ratio KCMD accurately with a high quick response.

As a result, NOx can optimally be purified by the catalytic converter 3, i.e., NOx can optimally be purified to maximize the purification rate thereof.

Therefore, the deteriorated state of the catalytic converter 3 can be evaluated appropriately while NOx is being optimally purified by the catalytic converter 3.

The present embodiment takes into account the fact that the air-fuel ratio-related characteristics of the output VS of the exhaust gas sensor 5 have no maximum value when the catalytic converter 3 is brand-new. In the situation where the function output VSH1 of the exhaust gas sensor 5 which is the function value of the quadratic function determined by the identified values of the parameters a1, b1, c1 is of a negative value, i.e., in the situation where the criterion formula $(b1^2 - 4 \cdot a1 \cdot c1)$ is of a positive value, the value of the air-fuel ratio in the leaner air-fuel ratio range at which the function value of the quadratic function (the function output VSH1) is "0" is set as the target air-fuel ratio KCMD.

Consequently, even when the catalytic converter 3 is brand-new, the catalytic converter 3 can well purify various gas components including NOx without impairing the purification of the other gas components than NOx. Thus, the catalytic converter 3 can maintain its good purifying capability irrespective of the deteriorated state thereof.

In the present embodiment, the output VS of the exhaust gas sensor 5 has positive characteristics with respect to the NOx concentration. However, an exhaust gas sensor 5 whose output VS has negative characteristics (the output VS decreases as NOx increases) with respect to the NOx concentration as indicated by the imaginary-line curve in FIG. 2 may be employed. With such negative characteristics, because the NOx concentration detected by the exhaust gas sensor, i.e., the NOx concentration recognized from the output of the exhaust gas sensor 5, has a minimum value with respect to the air-fuel ratio of the engine 1 as described above, the output itself of the exhaust gas sensor has a maximum value with respect to the air-fuel ratio of the engine 1. In this case, as with the present embodiment, the deteriorated state of the catalytic converter 3 can be evaluated using the parameters of a quadratic function.

Specifically, the air-fuel ratio-related characteristics of the output of the exhaust gas sensor are expressed by a quadratic function, and the values of the parameters of the quadratic function are identified, as with the above embodiment. As the deterioration of the catalytic converter 3 progresses, the graph of the quadratic function is shifted into the leaner air-fuel ratio range, and its gradient increases. Furthermore, as the deterioration of the catalytic converter 3 progresses, the graph of the quadratic function is shifted in a direction to reduce its function value, i.e., a direction to increase the NOx concentration represented by the function value of the quadratic function. Therefore, the value of the air-fuel ratio which maximizes the function value of the quadratic function or the value of the differential air-fuel ratio, the maximum value of the function value of the quadratic function, and the gradient of the graph of the quadratic function, or more accurately the absolute value of the gradient, at the value of the air-fuel ratio to which the air-fuel ratio has been changed from a value that maximizes the function value of the quadratic function into the richer or leaner air-fuel ratio range by a predetermined air-fuel ratio change, are used as evaluating parameters, instead of the first, second, and third deterioration evaluating parameters described above, for evaluating the deteriorated state of the catalytic converter 3. In this case, the maximum value of the function value of the quadratic function decreases as the deterioration of the catalytic converter 3 progresses, unlike the second deterioration evaluating parameter (the minimum value of the quadratic function) in the above embodiment. Therefore, for evaluating the deteriorated state of the catalytic converter 3 based on the maximum value of the quadratic function, when the maximum value becomes smaller than a predetermined threshold, it is necessary to evaluate the deteriorated state of the catalytic converter 3 as the deterioration-in-progress state.

In the above embodiment, the output VS of the exhaust gas sensor 5 is used as a dependent variable of the quadratic function. However, the NOx concentration recognized from the output VS of the exhaust gas sensor 5, i.e., the NOx concentration converted from the output VS according to the characteristics shown in FIG. 2, may be used as a dependent variable of the quadratic function. In this case, the values of the parameters of the quadratic function are identified using data of the NOx concentration converted from the data of the actual output VS of the exhaust gas sensor 5. Then, the deteriorated state of the catalytic converter 3 may be evaluated using deterioration evaluating parameters that are determined from the parameters of the quadratic function in exactly the same manner as with the above embodiment. The algorithm for evaluating the deteriorated state of the catalytic converter 3 remains the same irrespectively of whether the output of the exhaust gas sensor 5 is of positive or negative characteristics.

A system for carrying out a method of evaluating a deteriorated state of a catalytic converter according to a second embodiment of the present invention will be described below with reference to FIGS. 16 through 19. The system according to the second embodiment differs from the system according to the first embodiment with respect to the type of an exhaust gas sensor, i.e., the type of a gas component that is detected, and part (specifically, the processing in STEP6 shown in FIG. 12) of the processing sequence of the target air-fuel ratio calculating means of the main processing controller, and is identical to the system according to the first embodiment with respect to other system details and operation. Therefore, those parts of the system according to the second embodiment which are identical to those of the system according to the first embodiment are denoted by identical reference characters, and will not be described in detail below.

In the second embodiment, the exhaust gas sensor 5 disposed downstream of the catalytic converter 3 shown in FIG. 1 comprises an HC sensor for detecting the concentration of HC among gas components to be purified by the catalytic converter 3. The characteristics of the output VS the exhaust gas sensor 5 with respect to the HC concentration are positive characteristics such that the level of the output VS increases substantially linearly as the HC concentration increases.

The characteristics of purification of HC by the catalytic converter 3 will be described below.

Figure 17:
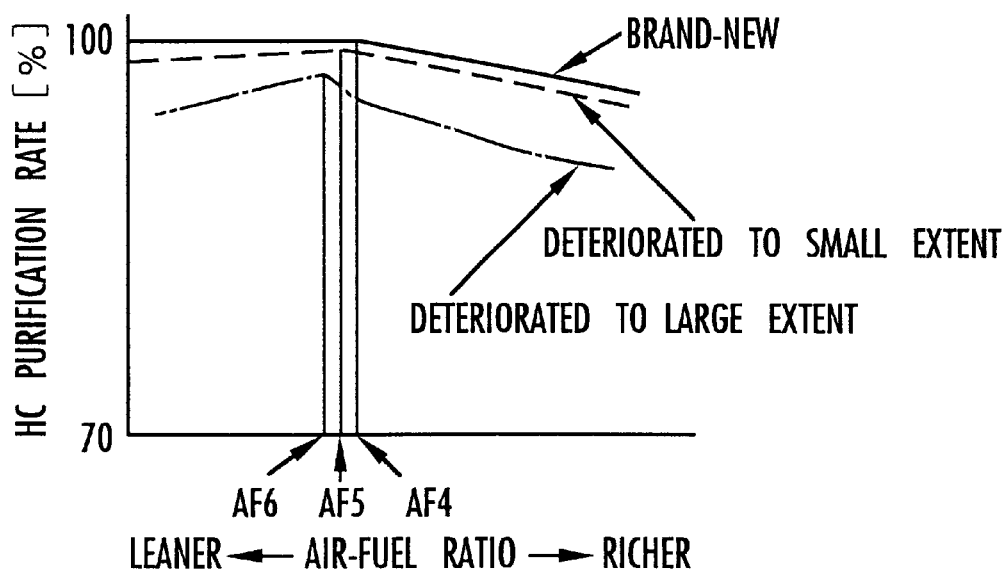
FIG. 17 is a diagram showing the capabilities of the catalytic converter of the system according to the second embodiment to purify HC.

The catalytic converter 3 basically has the characteristics of purification of HC, i.e., the characteristics of the purification rate of HC, with respect to changes in the air-fuel ratio of the engine 1, as shown in FIG. 17. Specifically, a solid-line curve, a broken-line curve, and a dot-and-dash-line curve shown in FIG. 17 represent catalytic converters 3 which correspond respectively to the solid-line, broken-line, and dot-and-dash-line curves shown in FIG. 3.

As indicated by the solid-line curve shown in FIG. 17, the purification rate of HC by the brand-new catalytic converter 3 is of a substantially constant maximum level (substantially 100%) when the air-fuel ratio of the engine 1 is in an air-fuel ratio range leaner than a certain value AF4 (this value is essentially in agreement with the value AF1 of the air-fuel ratio shown in FIG. 3), and decreases when the air-fuel ratio of the engine 1 is in an air-fuel ratio range richer than the value AF4.

When the catalytic converter 3 is deteriorated to a certain extent, as indicated by the broken-line and dot-and-dash-line curves in FIG. 17, the purification rate of HC has a maximum value, i.e., a peak, at a certain air-fuel ratio AF5 (the broken-line curve) or a certain air-fuel ratio AF6 (the dot-and-dash-line curve). Furthermore, the purification rate of HC decreases when the air-fuel ratio of the engine 1 changes to a richer range or a leaner range from the air-fuel ratio AF5 or AF6 which corresponds to the maximum purification rate of HC. The values AF5, AF6 generally agree with the respective values AF2, AF3 shown in FIG. 3.

The reduction from the maximum value of the purification rate of HC is slightly more gradual in the leaner air-fuel ratio range than in the richer air-fuel ratio range, i.e., the gradient of the curve is smaller in the leaner air-fuel ratio range than in the richer air-fuel ratio range. The maximum value of the purification rate of HC when the catalytic converter 3 is deteriorated is smaller than the maximum value of the purification rate of HC when the catalytic converter 3 is brand-new. The maximum value of the purification rate of HC becomes smaller as the catalytic converter 3 is progressively deteriorated.

Therefore, as with the purification rate of NOx, the purification rate of HC purified by the catalytic converter 3 has such characteristics that it basically has a maximum value as the air-fuel ratio of the engine 1 changes, except when the catalytic converter 3 is brand-new.

In the various deteriorated states of the catalytic converter 3, including the brand-new state of the catalytic converter 3, the air-fuel ratios AF4, AF5, AF6 where the purification rate of HC is maximum are basically shifted into the leaner air-fuel ratio range as the deterioration of the catalytic converter 3 progresses. Furthermore, the purification rate of HC changes sharply, i.e., the curves of the purification rate of HC become convex more sharply, in the vicinity of the air-fuel ratios AF4, AF5, AF6 basically as the deterioration of the catalytic converter 3 progresses.

Figure 18:
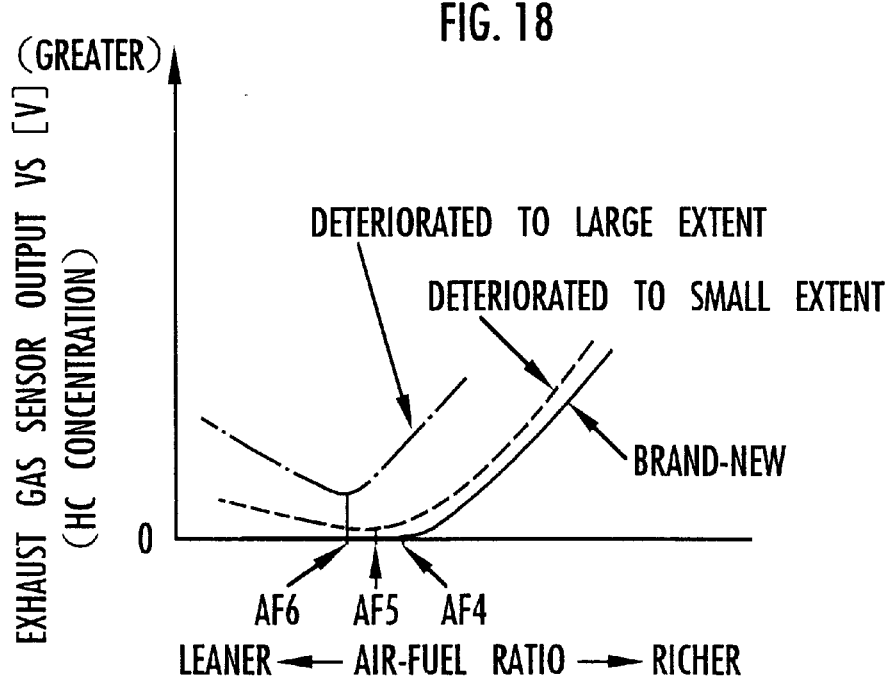
FIG. 18 is a diagram showing the output of the exhaust gas sensor (HC sensor) used by the system according to the second embodiment or the concentration of HC detected by the exhaust gas sensor depending on the air-fuel ratio.

Since the catalytic converter 3 has the above HC purification characteristics, the HC concentration detected by the exhaust gas sensor 5 (HC sensor) downstream of the catalytic converter 3, i.e., the HC concentration of the exhaust gas that has been purified by the catalytic converter 3, is basically of such characteristics representing a vertical reversal of the characteristic curves shown in FIG. 17, with respect to changes in the air-fuel ratio of the engine 1, as shown in FIG. 18. Accordingly, as with the NOx concentration of the exhaust gas that has been purified by the catalytic converter 3, the HC concentration basically has minimum values as indicated by the broken-line and dot-and-dash-line concave curves in FIG. 18, except when the catalytic converter 3 is brand-new as represented by the solid-line curve shown in FIG. 18.

Because the output characteristics of the exhaust gas sensor 5 with respect to the HC concentration are positive characteristics as described above, the characteristics of the output VS of the exhaust gas sensor 5 with respect to changes in the air-fuel ratio of the engine 1 are also the same as the characteristics of the HC concentration shown in FIG. 18. Specifically, the characteristics of the output VS of the exhaust gas sensor 5 (HC sensor) with respect to changes in the air-fuel ratio of the engine 1, except when the catalytic converter 3 is brand-new, or when the catalytic converter 3 is somewhat deteriorated, are such that the output VS of the exhaust gas sensor 5 has minimum values as indicated by the concave curves in FIG. 18 at the air-fuel ratios AF5, AF6 of the engine 1 where the purification rate of HC by the catalytic converter 3 is maximum, as indicated by the broken-line and dot-and-dash-line curves in FIG. 18. When the catalytic converter 3 is brand-new, as indicated by the solid-line curve in FIG. 18, in an air-fuel ratio range leaner than the air-fuel ratio AF4, i.e., in an air-fuel ratio range where the purification rate of HC is kept at a substantially constant maximum level (about 100%), the output VS of the exhaust gas sensor 5 is kept at a substantially constant minimum level (about 0 V). When the air-fuel ratio of the engine 1 changes to a value richer than the value AF4, the output VS of the exhaust gas sensor 5 increases.

The air-fuel ratios AF4, AF5, AF6 of the engine 1 where the output VS of the exhaust gas sensor 5 is minimum are shifted into the leaner air-fuel ratio range as the deterioration of the catalytic converter 3 progresses. The output VS of the exhaust gas sensor 5 at the various values of the air-fuel ratio of the engine 1, including the minimum values thereof, increases as the deterioration of the catalytic converter 3 progresses. The gradients of the curves of the air-fuel ratio-related characteristics of the output VS of the exhaust gas sensor 5 in the air-fuel ratio ranges on both sides of the air-fuel ratios AF4, AF5, AF6 of the engine 1 where the output VS of the exhaust gas sensor 5 is minimum, increase as the deterioration of the catalytic converter 3 progresses. Therefore, the air-fuel ratio-related characteristics of the output VS of the exhaust gas sensor 5 (HC sensor) change as the deterioration of the catalytic converter 3 progresses, in basically the same manner as when the exhaust gas sensor 5 comprises an NOx sensor.

Based on the purification characteristics of the catalytic converter 3, the main processing controller 6, particularly the target air-fuel ratio calculating means 6b, will be described below.

As described above, the characteristics of the output VS of the exhaust gas sensor 5 (HC sensor) with respect to the air-fuel ratio of the engine 1, i.e., the air-fuel ratio-related characteristics of the output VS, basically have minimum values as indicated by the concave curves in FIG. 18, as is the case with the air-fuel ratio-related characteristics of the output of the NOx sensor described above with respect to the first embodiment.

Therefore, the air-fuel ratio-related characteristics of the output VS of the exhaust gas sensor 5 (HC sensor), i.e., the air-fuel ratio-related characteristics of the HC concentration recognized from the output VS of the exhaust gas sensor 5, can approximately be expressed by a quadratic function according to the equation (1) by identifying the parameters a1, b1, c1 of the quadratic function in the same manner as with the first embodiment. The target air-fuel ratio KCMD which maximizes the purification rate of HC by the catalytic converter 3 is basically given as the value of an air-fuel ratio where the function value of the above quadratic function, i.e., the function output VSH1 of the exhaust gas sensor 5, is minimum.

The graph of the air-fuel ratio-related characteristics of the output VS of the exhaust gas sensor 5 (HC sensor) changes in the same manner as the graph of the air-fuel ratio-related characteristics of the output of the NOx sensor, as the deterioration of the catalytic converter 3 progresses. That is, as the deterioration of the catalytic converter 3 progresses, the graph of the quadratic function is shifted into the leaner air-fuel ratio range, and in a direction to increase the function value of the quadratic function or the HC concentration represented by the function value. The gradient of the graph of the quadratic function on both sides of the air-fuel ratio at the minimum point of the graph of the quadratic function increases as the deterioration of the catalytic converter 3 progresses.

In the present embodiment, as with the second embodiment, the quadratic function according to the equation (1) is used as a nonlinear function representing the air-fuel ratio-related characteristics of the output VS of the exhaust gas sensor 5 (HC sensor) in order to determine the target air-fuel ratio KCMD of the engine 1 and evaluate the deteriorated state of the catalytic converter 3. The values of the parameters a1, b1, c1 of the quadratic function are identified by the identifying means 6a of the main processing controller 6 according to the algorithm (sequential identifying algorithm) described above in the first embodiment (see the equations (2)–(6) and FIG. 14).

The target air-fuel ratio calculating means 6b of the main processing means 6 basically determines, as the target air-fuel ratio KCMD, the value of an air-fuel ratio which minimizes the function value of the quadratic function with the values of the parameters a1, b1, c1 thereof being identified. The target differential air-fuel ratio kcmd (=KCMD−FLAF/BASE) which determines the target air-fuel ratio KCMD can be determined using the identified values of the parameters a1, b1 according to the equation, and the target air-fuel ratio KCMD can be obtained by adding the air-fuel ratio reference value FLAF/BASE to the target differential air-fuel ratio kcmd.

In the present embodiment, however, when the catalytic converter 3 is brand-new, the target air-fuel ratio KCMD is determined according to processing operations different from those of the first embodiment.

Specifically, when the catalytic converter 3 is brand-new, the air-fuel ratio-related characteristics of the output VS of the exhaust gas sensor 5 (HC sensor) are indicated by the solid-line curve shown in FIG. 18, and hence have no minimum values, with the output VS being at a substantially constant minimum level (about 0%) in the leaner air-fuel ratio range. In this case, sampled data of the output VS of the exhaust gas sensor 5 and the differential air-fuel ratio kact (=KACT−FLAF/BASE) according to the LAF sensor 4 are obtained with a tendency indicated by dots in FIG. 19, for example. At this time, the graph of the quadratic function determined by the identified values of the parameters a1, b1, c1 is indicated by the solid-line curve in FIG. 19. At this time, the minimum value of the function value of the quadratic function (the function output VSH1) is a negative value which the actual output VS of the exhaust gas sensor 5 cannot take, i.e., a value smaller than the output VS of the exhaust gas sensor 5 when the HC concentration is substantially "0".

Figure 19:
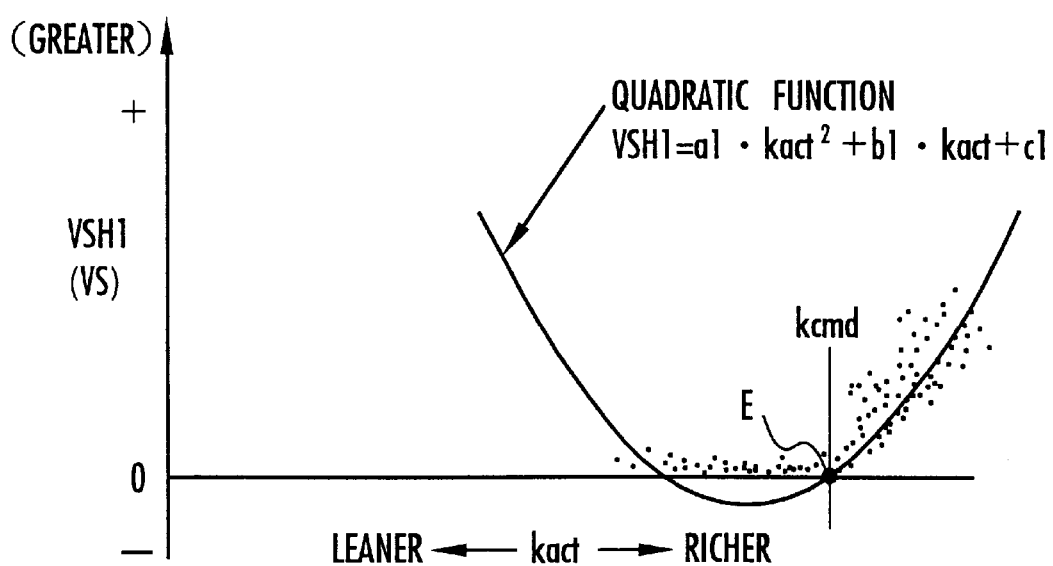
FIG. 19 is a diagram illustrative of a process of calculating a target air-fuel ratio according to the second embodiment.

When the catalytic converter 3 is brand-new, the air-fuel ratio at which the purification rates of various gas components such as NOx, including HC, are high is not of a value which minimizes the function value of the quadratic function, but generally of a value near the air-fuel ratio at a point E in FIG. 19.

In the present embodiment, if the minimum value of the quadratic function determined by the identified values (latest identified values) of the parameters a1, b1, c1 becomes negative, i.e., if the identified values of the parameters a1, b1, c1 satisfy the inequality: $b1^2-4 \cdot a1 \cdot c1 > 0$, then the target air-fuel ratio calculating means 6b determines one of two values of the differential air-fuel ratio kact at which the function value of the quadratic function (the function output VSH1 of the exhaust gas sensor 5) is "0", which one of the two values is in the leaner air-fuel ratio range (the value of the differential air-fuel ratio kact at the point E in FIG. 19), as the target differential air-fuel ratio kcmd. Then, the target air-fuel ratio calculating means 6b determines the target air-fuel ratio KCMD by adding the air-fuel ratio reference value FLAF/BASE to the target differential air-fuel ratio kcmd thus determined.

In the present embodiment, specifically, the target air-fuel ratio calculating means 6b determines the target differential air-fuel ratio kcmd(k) depending on the value of the criterion formula $(b1^2-4 \cdot a1 \cdot c1)$ determined by the identified values (specifically, the latest identified values a1(k+1), b1(k+1), c1(k+1)) of the parameters a1, b1, c1 of the quadratic function, according to the following equations (25):

When
$$b1^2-4 \cdot a1 \cdot c1 \leq 0,$$
$$kcmd = -\frac{b1}{2 \cdot a1}$$

When
$$b1^2-4 \cdot a1 \cdot c1 > 0,$$
$$kcmd = \frac{-b1+\sqrt{b1^2-4 \cdot a1 \cdot c1}}{2 \cdot a1} \qquad (25)$$

Then, the target air-fuel ratio calculating means 6b determines the target air-fuel ratio KCMD(k) in each control cycle by adding the air-fuel ratio reference value FLAF/BASE to the target differential air-fuel ratio kcmd(k) thus determined, according to the above equation (10).

The equation (25) is the same as the equation (9) according to the first embodiment when $b1^2-4 \cdot a1 \cdot c1 \leq 0$, but differs from the equation (9) when $b1^2-4 \cdot a1 \cdot c1 > 0$, i.e., when the catalytic converter 3 is brand-new.

With respect to the evaluation of the deteriorated state of the catalytic converter 3, the graph of the quadratic function changes in the same manner as with the first embodiment as the deterioration of the catalytic converter 3 progresses. In the present embodiment, therefore, the deteriorated state evaluating means 6c of the main processing controller 6 uses the first through third deterioration evaluating parameters AGDP1, AGDP2, AGDP3 that are determined from the identified values of the parameters a1, b1, c1 of the quadratic function according to the above equations (11) through (13). Then, the deteriorated state evaluating means 6c compares the first through third deterioration evaluating parameters AGDP1, AGDP2, AGDP3 with respective predetermined thresholds LMT1, LMT2, LMT3 for thereby determining whether the catalytic converter 3 is in the deterioration-in-progress state or the non-deteriorated state according to the subroutine shown in FIG. 15. If the catalytic converter 3 is in the deterioration-in-progress state, then the deterioration indicator 8 indicates the evaluation. However, the rate of change of the quadratic function as the deterioration of the catalytic converter 3 progresses may not necessarily be the same as the rate of change in the first embodiment. Therefore, the above thresholds LMT1, LMT2, LMT3 to be compared with the first through third deterioration evaluating parameters AGDP1, AGDP2, AGDP3 are exclusively used by the present embodiment.

As described above, the processing of the main processing controller 6 in the second embodiment differs from the processing of the main processing controller 6 in the first embodiment with respect to the calculation of the target differential air-fuel ratio kcmd, i.e., the processing in STEP6 shown in FIG. 12. Other details of the processing of the main processing controller 6 in the second embodiment are identical to details of the processing of the main processing controller 6 in the first embodiment.

Other structural and operational details, e.g., structural and operational details of the fuel supply controller 7, are exactly the same as those of the first embodiment.

The system according to the second embodiment offers the same advantages as those of the system according to the first embodiment. Those advantages will be summarized below. The parameters a1, b1, c1 are identified to obtain a quadratic function which well approximates the air-fuel ratio-related characteristics of the output VS of the exhaust gas sensor 5 (HC sensor). The first through third deterioration evaluating parameters AGDP1, AGDP2, AGDP3 are determined from the identified values of the parameters a1, b1, c1, and the deteriorated state of the catalytic converter 3 is evaluated based on the first through third deterioration evaluating parameters AGDP1, AGDP2, AGDP3. Therefore, the deteriorated state of the catalytic converter 3 is appropriately evaluated according to a relatively simple algorithm.

Using the above quadratic function, it is possible to determine the target air-fuel ratio KCMD of the engine which minimizes the output VS of the exhaust gas sensor 5 (HC sensor), i.e., the HC concentration of the exhaust gas that has been purified by the catalytic converter 3. When the air-fuel ratio of the engine 1 is manipulated into the target air-fuel ratio KCMD according to the feedback control process using the adaptive controller 17, the catalytic converter 3 can well purify HC, i.e., purify HC in a manner to maximize the purification rate of HC.

When the catalytic converter 3 is brand-new, i.e., when the function output VSH1 of the exhaust gas sensor 5 which is the function value of the quadratic function determined by the identified values of the parameters a1, b1, c1 is of a negative value, one, in the richer air-fuel ratio range, of the values of the air-fuel ratio at which the function value of the quadratic function (the function output VSH1) is "0" is established as the target air-fuel ratio KCMD. Therefore, the catalytic converter 3 can well purify various gas components including HC regardless of the deteriorated state of the catalytic converter 3.

The second embodiment may also be modified in the same manner as described above with respect to the first embodiment. Specifically, the exhaust gas sensor 5 may have negative characteristics such that the output VS decreases as the HC concentration increases, as indicated by the imaginary-line curve in FIG. 16. Furthermore, the independent variable of the quadratic function may represent the HC concentration recognized from the output VS according to the characteristics shown in FIG. 16, rather than the output VS of the exhaust gas sensor 5.

In the first and second embodiments, the first through third deterioration evaluating parameters AGDP1, AGDP2, AGDP3 are used to evaluate the deteriorated state of the catalytic converter 3. However, one or two of those deterioration evaluating parameters may be used to evaluate the deteriorated state of the catalytic converter 3.

In the above embodiments, the deteriorated state of the catalytic converter 3 is finally determined as the deterioration-in-progress state only when the temporary evaluations based on the respective deterioration evaluating parameters AGDP1, AGDP2, AGDP3 represent the deterioration-in-progress state. However, the deteriorated state of the catalytic converter 3 may be finally determined as the deterioration-in-progress state when one or two of the temporary evaluations based on the respective deterioration evaluating parameters AGDP1, AGDP2, AGDP3 represent the deterioration-in-progress state.

In the above embodiments, the deteriorated state of the catalytic converter 3 is evaluated as one of the two states, i.e., the deterioration-in-progress state and the non-deteriorated state. However, if an increased number of thresholds are used for comparison with the deterioration evaluating parameters AGDP1, AGDP2, AGDP3, then the deteriorated state of the catalytic converter 3 may be evaluated as three or more deteriorated states. In this case, different evaluations may be indicated depending on those three or more deteriorated states.

In the above embodiments, a change in the gradient of the graph of the quadratic function as the deterioration of the catalytic converter 3 progresses is recognized according to the third deterioration evaluating parameter AGDP3, i.e., the gradient of the graph of the quadratic function at the differential air-fuel ratio which has been changed from the differential air-fuel ratio at the minimum point of the graph of the quadratic function into the richer air-fuel ratio range by a predetermined air-fuel ratio change $\alpha$. However, a change in the gradient of the graph of the quadratic function as the deterioration of the catalytic converter 3 progresses may be recognized according to the gradient of the graph of the quadratic function at the differential air-fuel ratio which has been changed from the differential air-fuel ratio at the minimum point of the graph of the quadratic function into the leaner air-fuel ratio range by a predetermined air-fuel ratio change $\alpha$.

When the gradient of the graph of the quadratic function increases as the deterioration of the catalytic converter 3 progresses, the width of the graph of the quadratic function decreases. Therefore, two values of the differential air-fuel ratio where the function value is greater than the minimum value of the function value of the quadratic function by a predetermined quantity (constant quantity) may be determined using the identified values of the parameters a1, b1, c1 of the quadratic function, and a change in the gradient of the graph of the quadratic function may be recognized based on the difference between the determined values of the differential air-fuel ratio, which corresponds to the width of the graph of the quadratic function.

In the above embodiments, the exhaust gas sensor 5 comprises an NOx sensor or an HC sensor. However, the exhaust gas sensor 5 may comprise a sensor for detecting another gas component to be purified by the catalytic converter 3, e.g., a CO sensor for detecting the concentration of CO (carbon monoxide). Even if such an exhaust gas sensor is used, the air-fuel ratio-related characteristics of the output of the exhaust gas sensor can be approximately expressed by a nonlinear function such as a quadratic function or the like, and the parameters of the nonlinear function can be identified to evaluate the deteriorated state of the catalytic converter 3. Furthermore, using the nonlinear function, it is possible to control the air-fuel ratio of the engine 1 in order to minimize the concentration of the gas component that is detected by the exhaust gas sensor.

In the above embodiments, a quadratic function is used as a nonlinear function which expresses the air-fuel ratio-related characteristics of the output of the exhaust gas sensor or the concentration of a gas component that is recognized from the output. However, another type of nonlinear function such as a cubic function, a hyperbolic function, or the like may be used to evaluate the deteriorated state of the catalytic converter 3 and control the air-fuel ratio of the engine 1 in order to minimize the concentration of the gas component that is detected by the exhaust gas sensor.

In the above embodiments, the sampled data of the output KACT of the LAF sensor 4 is used so as to identify the values of the parameters a1, b1, c1 of the quadratic ratic function. However, because the output KACT of the LAF sensor 4 is basically controlled into agreement with the target air-fuel ratio KCMD, it is possible to identify the values of the parameters a1, b1, c1 of the quadratic function by using the target air-fuel ratio KCMD or the target differential air-fuel ratio kcmd, instead of the output KACT of the LAF sensor 4 or differential output kact thereof. In this case, the function output VSH1 of the exhaust gas sensor 5 is determined using the target differential air-fuel ratio kcmd determined in the past by the target air-fuel ratio calculating means 6$b$ (specifically, the target differential air-fuel ratio kcmd determined by the target air-fuel ratio calculating means 6$b$ in a control cycle prior to the dead time of a system which comprises the engine 1 and the fuel supply controller 7 as a system for generating an air-fuel ratio detected by the LAF sensor 4 from the target air-fuel ratio KCMD), instead of "kact" in the equation (1). Then, the values of the parameters a1, b1, c1 of the quadratic function are identified in order to minimize the function output VSH1 according to the same sequential identifying algorithm as those used in the above embodiments.

Although certain preferred embodiments of the present invention have been shown and described in detail, it should be understood that various changes and modifications may be made therein without departing from the scope of the appended claims.

What is claimed is:

1. A method of evaluating a deteriorated state of a catalytic converter which is disposed in an exhaust passage of an internal combustion engine for purifying an exhaust gas flowing through the exhaust passage, using data of the output of an exhaust gas sensor which is disposed downstream of the catalytic converter for detecting the concentration of a particular component of the exhaust gas purified by the catalytic converter while the internal combustion engine is in operation, comprising the steps of:

identifying the values of parameters contained in a nonlinear function for expressing the correlating characteristics of the concentration of the particular component, which is detected by said exhaust gas sensor and has a minimum and a maximum value with respect to an air-fuel ratio of the exhaust gas upstream of said catalytic converter, using data of the air-fuel ratio of the exhaust gas upstream of said catalytic converter and the data of the output of said exhaust gas sensor; and evaluating the deteriorated state of the catalytic converter based on the identified values of the parameters.

2. A method of evaluating a deteriorated state of a catalytic converter which is disposed in an exhaust passage of an internal combustion engine for purifying an exhaust gas flowing through the exhaust passage, using data of the output of an exhaust gas sensor which is disposed downstream of the catalytic converter for detecting the concentration of a particular component of the exhaust gas purified by the catalytic converter while the internal combustion engine is in operation, comprising the steps of:

identifying the values of parameters contained in a nonlinear function of a predetermined type for expressing the correlating characteristics of the concentration of the particular component detected by said exhaust gas sensor with respect to an air-fuel ratio of the exhaust gas upstream of said catalytic converter, using data of the air-fuel ratio of the exhaust gas upstream of said catalytic converter and the data of the output of said exhaust gas sensor;

evaluating the deteriorated state of the catalytic converter based on the identified values of the parameters; and wherein said step of identifying the values of parameters comprises the step of identifying the value of at least one of the parameters while limiting the value of said at least one of the parameters to a value satisfying a predetermined condition.

3. A method of evaluating a deteriorated state of a catalytic converter which is disposed in an exhaust passage of an internal combustion engine for purifying an exhaust gas flowing through the exhaust passage, using data of the output of an exhaust gas sensor which is disposed downstream of the catalytic converter for detecting the concentration of a particular component of the exhaust gas purified by the catalytic converter while the internal combustion engine is in operation, comprising the steps of:

identifying the values of parameters contained in a nonlinear function of a predetermined type for expressing the correlating characteristics of the concentration of the particular component detected by said exhaust gas sensor with respect to an air-fuel ratio of the exhaust gas upstream of said catalytic converter, using data of the air-fuel ratio of the exhaust gas upstream of said catalytic converter and the data of the output of said exhaust gas sensor;

evaluating the deteriorated state of the catalytic converter based on the identified values of the parameters;

sequentially identifying the values of the parameters of said nonlinear function according to a sequential identifying algorithm; and wherein said step of identifying the values of parameters comprises the step of identifying the value of at least one of the parameters while limiting the value of said at least one of the parameters to a value satisfying a predetermined condition.

4. A method according to claim 3, wherein the data of the air-fuel ratio of the exhaust gas upstream of said catalytic converter, which is used to identify the values of parameters contained in the nonlinear function, comprises data representing the difference between the air-fuel ratio of the exhaust gas and a predetermined reference value.

5. A method according to claim 3, wherein said nonlinear function comprises a quadratic function, and said step of identifying the values of parameters comprises the steps of:

regarding a coefficient of a term of maximum degree of said quadratic function as said at least one of the parameters which is to be limited; and identifying the value of said coefficient while limiting the value of said coefficient in order for the concentration of said particular component represented by the function value of said quadratic function to have a minimum value.

6. A method according to claim 3, wherein an air-fuel ratio sensor is disposed upstream of the catalytic converter for detecting an air-fuel ratio of the exhaust gas upstream of the catalytic converter, and said step of identifying the values of parameters comprises the step of:

using the air-fuel ratio detected by said air-fuel ratio sensor as the air-fuel ratio of the exhaust gas upstream of the catalytic converter.

7. A method according to claim 6, further comprising the steps of:

determining the value of an air-fuel ratio which minimizes the concentration of said particular component represented by a function value of said nonlinear function with the values of the parameters thereof being identified, using the identified values of the parameters of the nonlinear function, and obtaining the determined value of the air-fuel ratio as a target air-fuel ratio of the exhaust gas upstream of the catalytic converter; and manipulating the air-fuel ratio of an air-fuel mixture combusted by said internal combustion engine according to a feedback control process to converge the air-fuel ratio detected by said air-fuel ratio sensor to said target air-fuel ratio.

8. A method according to claim 3, wherein said step of evaluating the deteriorated state of the catalytic converter comprises the steps of:

determining the value of an evaluating parameter defined, using the parameters of said nonlinear function, as representing a change depending on the progress of deterioration of said catalytic converter, from the identified values of the parameters of said nonlinear function; and evaluating the deteriorated state of the catalytic converter based on the value of the evaluating parameter.

9. A method according to claim 8, wherein said evaluating parameter comprises an evaluating parameter which changes as a graph of said nonlinear function with the identified values of the parameters is shifted into a leaner air-fuel ratio range as the deterioration of said catalytic converter processes.

10. A method according to claim 9, wherein said evaluating parameter comprises the value of an air-fuel ratio which minimizes the concentration of said particular component represented by a function value of said nonlinear function.

11. A method according to claim 8, wherein said evaluating parameter comprises an evaluating parameter which changes as a graph of said nonlinear function with the identified values of the parameters is shifted in a direction to increase the concentration of said particular component represented by a function value of said nonlinear function as the deterioration of said catalytic converter processes.

12. A method according to claim 11, wherein said evaluating parameter comprises an extremal value of the function value of the nonlinear function which corresponds to a minimum value of the concentration of said particular component represented by the function value of said nonlinear function.

13. A method according to claim 8, wherein said evaluating parameter comprises an evaluating parameter which changes as the gradient of a graph of said nonlinear function increases in an air-fuel ratio range which is leaner or richer than the value of an air-fuel ratio which minimizes the concentration of said particular component represented by a function value of said nonlinear function with the identified values of said parameters, as deterioration of said catalytic converter processes.

14. A method according to claim 13, wherein said evaluating parameter comprises a function value of said nonlinear function at the value of an air-fuel ratio which is changed a predetermined quantity from the value of an air-fuel ratio which minimizes the concentration of said particular component represented by the function value of said nonlinear function.

15. A method according to claim 8, wherein said evaluating parameter comprises a plurality of evaluating parameters, and said step of evaluating the deteriorated state of the catalytic converter comprises the step of:

combining evaluations of the deteriorated state of the catalytic converter based on said plurality of evaluating parameters to evaluate the deteriorated state of the catalytic converter.

* * * * *